United States Patent
Saito et al.

(10) Patent No.: US 9,762,506 B2
(45) Date of Patent: Sep. 12, 2017

(54) VIRTUAL GUEST MANAGEMENT SYSTEM AND VIRTUAL GUEST MANAGEMENT METHOD

(71) Applicant: HITACHI, LTD., Tokyo (JP)

(72) Inventors: Hiroshi Saito, Tokyo (JP); Norihiro Naka, Tokyo (JP); Yoshifumi Takamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 231 days.

(21) Appl. No.: 14/428,062

(22) PCT Filed: Feb. 6, 2013

(86) PCT No.: PCT/JP2013/052761
§ 371 (c)(1),
(2) Date: Mar. 13, 2015

(87) PCT Pub. No.: WO2014/122743
PCT Pub. Date: Aug. 14, 2014

(65) Prior Publication Data
US 2015/0236975 A1    Aug. 20, 2015

(51) Int. Cl.
*G06F 15/173* (2006.01)
*H04L 12/911* (2013.01)
(Continued)

(52) U.S. Cl.
CPC ........ *H04L 47/748* (2013.01); *H04L 43/0882* (2013.01); *H04L 67/10* (2013.01)

(58) Field of Classification Search
CPC ... H04L 63/10; H04L 67/1012; H04L 47/822; G06F 11/34; G06F 9/5088; G06F 9/5077; G06F 9/45558; G06F 9/45533
(Continued)

(56) References Cited

U.S. PATENT DOCUMENTS

| 2010/0030877 | A1 | 2/2010 | Yanagisawa | |
| 2011/0239215 | A1* | 9/2011 | Sugai | G06F 9/45558 718/1 |

(Continued)

FOREIGN PATENT DOCUMENTS

| JP | 2005115653 A | 4/2005 |
| JP | 2011198332 A | 10/2011 |

(Continued)

*Primary Examiner* — Wing F Chan
*Assistant Examiner* — Andrew Woo
(74) *Attorney, Agent, or Firm* — Volpe and Koenig, P.C.

(57) ABSTRACT

Proposed are a virtual guest management system and a virtual guest management method capable of improving the usage efficiency of resources.
In a virtual guest management system comprising a plurality of virtual hosts, a virtual guest arranged in each of the plurality of virtual hosts, and a management system that manages migration of the virtual guest, the management system adds a used resource history of a migration-target virtual guest to a used resource history of a destination candidate virtual host, estimates the used resource history of the destination candidate virtual host upon assuming that the migration-target virtual guest was migrated, and determines the destination virtual host among the destination candidate virtual hosts based on an estimated result.

6 Claims, 20 Drawing Sheets

| # | STORAGE APPARATUS NAME | RAID GROUP | IOPS UPPER LIMIT | LU | TOTAL CAPACITY (GB) | UNUSED CAPACITY (GB) |
|---|---|---|---|---|---|---|
| 1 | STORAGE APPARATUS 1 | RAID1 | 1900 | RR | 500 | 125 |
| 2 | | | | SS | 600 | XXX |
| 3 | | RAID2 | 2400 | TT | 600 | XXX |
| 4 | STORAGE APPARATUS 2 | RAID1 | 1600 | UU | 400 | XXX |
| 5 | | | | VV | 600 | XXX |
| 6 | | RAID2 | 1900 | WW | 1600 | XXX |

T111  T112  T113  T114  T115  T116  T117

T110

(51) Int. Cl.
*H04L 29/08* (2006.01)
*H04L 12/26* (2006.01)

(58) Field of Classification Search
USPC .................................... 709/223, 224, 226
See application file for complete search history.

(56) References Cited

U.S. PATENT DOCUMENTS

2013/0097601 A1* 4/2013 Podvratnik ........... G06F 9/5027
718/1
2014/0201732 A1* 7/2014 Haag ................... G06F 9/45533
718/1

FOREIGN PATENT DOCUMENTS

| WO | 2008102739 A1 | 8/2008 |
| WO | 2012046386 A1 | 4/2012 |

* cited by examiner

FIG. 4

VIRTUAL GUEST XX — T1

| TIME STAMP | CPU(MHz) | MEMORY (MB) | NETWORK (Mbps) | DISK (Mbps) | IOPS | USED DISK CAPACITY (GB) |
|---|---|---|---|---|---|---|
| 2012/9/10 0:10 | 1410 | 1397.5 | 5.0 | 1.9 | 0.2 | 120.1 |
| 2012/9/10 1:10 | 1580 | 1526.8 | 5.7 | 1.9 | 0.3 | 120.1 |
| 2012/9/10 2:10 | 1423 | 1375.2 | 5.3 | 1.6 | 0.5 | 120.1 |
| 2012/9/10 3:10 | 1374 | 1584.1 | 5.0 | 1.7 | 0.5 | 120.1 |
| 2012/9/10 4:10 | 1617 | 1554.5 | 5.6 | 1.8 | 0.6 | 120.1 |
| 2012/9/10 5:10 | 1414 | 1460.9 | 5.8 | 1.9 | 0.6 | 120.1 |
| 2012/9/10 6:10 | 1411 | 1452.1 | 5.3 | 1.9 | 0.5 | 120.1 |
| 2012/9/10 7:10 | 1506 | 1572.9 | 5.1 | 1.8 | 0.5 | 120.1 |
| 2012/9/10 8:10 | 1552 | 1405.3 | 5.8 | 1.7 | 0.2 | 120.1 |
| 2012/9/10 9:10 | 1554 | 1366.6 | 5.5 | 1.9 | 0.3 | 120.1 |
| 2012/9/10 10:10 | 1417 | 1532.9 | 5.1 | 1.7 | 0.6 | 120.1 |
| 2012/9/10 11:10 | 1375 | 1420.1 | 5.4 | 1.8 | 0.2 | 120.1 |
| 2012/9/10 12:10 | 1554 | 1569.2 | 5.1 | 2.0 | 0.6 | 120.1 |
| 2012/9/10 13:10 | 1531 | 1614.2 | 5.1 | 1.8 | 0.3 | 120.1 |
| 2012/9/10 14:10 | 1435 | 1555.4 | 5.7 | 1.7 | 0.2 | 120.1 |
| 2012/9/10 15:10 | 1483 | 1429.1 | 5.1 | 1.7 | 0.4 | 120.1 |
| 2012/9/10 16:10 | 1423 | 1545.8 | 5.5 | 2.0 | 0.5 | 120.1 |
| 2012/9/10 17:10 | 1429 | 1381.9 | 5.7 | 1.9 | 0.6 | 120.1 |
| 2012/9/10 18:10 | 1624 | 1428.7 | 5.2 | 1.8 | 0.5 | 120.1 |
| 2012/9/10 19:10 | 1543 | 1504.8 | 5.9 | 1.7 | 0.4 | 120.1 |
| 2012/9/10 20:10 | 1494 | 1481.0 | 5.6 | 1.7 | 0.2 | 120.2 |
| 2012/9/10 21:10 | 1588 | 1422.7 | 6.0 | 1.8 | 0.3 | 120.2 |
| 2012/9/10 22:10 | 1532 | 1610.1 | 5.5 | 1.8 | 0.6 | 120.2 |
| 2012/9/10 23:10 | 1418 | 1462.7 | 5.3 | 1.8 | 0.2 | 120.2 |

| # | VIRTUAL GUEST NAME | CONNECTION DESTINATION NETWORK | CONNECTION DESTINATION LU |
|---|---|---|---|
| 1 | VIRTUAL GUEST 1 | XX.XX.XX.XX, YY.YY.YY.YY | RR, SS |
| 2 | VIRTUAL GUEST 2 | XX.XX.XX.XX | RR |
| 3 | VIRTUAL GUEST 3 | XX.XX.XX.XX | RR |
| 4 | VIRTUAL GUEST 4 | XX.XX.XX.XX | RR |
| 5 | VIRTUAL GUEST 5 | YY.YY.YY.YY | RR |
| 6 | VIRTUAL GUEST 6 | YY.YY.YY.YY | TT |

| # | VIRTUAL HOST NAME | CONNECTION DESTINATION LU | CONNECTION DESTINATION NETWORK |
|---|---|---|---|
| 1 | VIRTUAL HOST 1 | RR, SS, TT | XX.XX.XX.XX, YY.YY.YY.YY |
| 2 | VIRTUAL HOST 2 | RR, SS, TT | XX.XX.XX.XX, YY.YY.YY.YY |

| VIRTUAL HOST XX | | | | | |
|---|---|---|---|---|---|
| TIME STAMP | CPU (MHz) | MEMORY (MB) | NETWORK (Mbps) | DISK (Mbps) | IOPS |
| 2012/09/10 00:10 | 16227 | 16227.4 | 58.8 | 19 | 2.3 |
| 2012/09/10 01:10 | 16235 | 16235.3 | 58.9 | 19.1 | 3.1 |
| 2012/09/10 02:10 | 16243 | 16242.9 | 59 | 19.2 | 5.5 |
| 2012/09/10 03:10 | 16250 | 16250 | 59.2 | 19.3 | 6 |
| 2012/09/10 04:10 | 16257 | 16256.7 | 59.3 | 19.4 | 5.8 |
| 2012/09/10 05:10 | 16263 | 16262.9 | 59.4 | 19.5 | 5.8 |
| 2012/09/10 06:10 | 16269 | 16268.7 | 59.5 | 19.6 | 6 |
| 2012/09/10 07:10 | 16274 | 16274 | 59.6 | 19.7 | 5.1 |
| 2012/09/10 08:10 | 16279 | 16278.9 | 59.6 | 19.7 | 2.5 |
| 2012/09/10 09:10 | 16283 | 16283.2 | 59.7 | 19.8 | 3.3 |
| 2012/09/10 10:10 | 16287 | 16287.1 | 59.8 | 19.8 | 5.8 |
| 2012/09/10 11:10 | 16290 | 16290.5 | 59.8 | 19.9 | 2.1 |
| 2012/09/10 12:10 | 16293 | 16293.4 | 59.9 | 19.9 | 5.7 |
| 2012/09/10 13:10 | 16296 | 16295.7 | 59.9 | 19.9 | 3.5 |
| 2012/09/10 14:10 | 16298 | 16297.6 | 60 | 20 | 2.3 |
| 2012/09/10 15:10 | 16299 | 16298.9 | 60 | 20 | 4.6 |
| 2012/09/10 16:10 | 16300 | 16299.7 | 60 | 20 | 5.8 |
| 2012/09/10 17:10 | 16300 | 16300 | 60 | 20 | 6 |
| 2012/09/10 18:10 | 16300 | 16299.8 | 60 | 20 | 5.9 |
| 2012/09/10 19:10 | 16299 | 16299 | 60 | 20 | 4.8 |
| 2012/09/10 20:10 | 16298 | 16297.8 | 60 | 20 | 2.5 |
| 2012/09/10 21:10 | 16296 | 16296 | 59.9 | 19.9 | 3 |
| 2012/09/10 22:10 | 16294 | 16293.7 | 59.9 | 19.9 | 6 |
| 2012/09/10 23:10 | 16291 | 16290.9 | 59.8 | 19.9 | 2 |
| T41 | T42 | T43 | T44 | T45 | T46 |

FIG. 8

| # | VIRTUAL HOST NAME | TIME STAMP | CPU(MHz) | MEMORY CAPACITY (GB) | NETWORK BANDWIDTH (Mbps) | T57 DISK I/O (Gbps) |
|---|---|---|---|---|---|---|
| 1 | VIRTUAL HOST 1 | 2011/10/12 12:00 | 36000 | 96 | 4096 | 8 |
| 2 | VIRTUAL HOST 2 | 2011/10/15 12:00 | 28800 | 32 | 4096 | 8 |
| 3 | VIRTUAL HOST 3 | 2011/12/16 12:00 | 28800 | 76 | 2048 | 8 |

FIG. 12

| # | VIRTUAL HOST NAME | CPU (MHz) | MEMORY CAPACITY (GB) | NETWORK BANDWIDTH (Mbps) | DISK I/O (Gpbs) |
|---|---|---|---|---|---|
| 1 | VIRTUAL HOST 1 | 14400 | 16 | 1920 | 2 |
| 2 | VIRTUAL HOST 2 | 9600 | 2 | 3600 | 4 |
| 3 | VIRTUAL HOST 3 | 3000 | 6 | 250 | 6 |

FIG. 13

| # | VIRTUAL HOST NAME | CPU (MHz) | MEMORY CAPACITY (GB) | NETWORK BANDWIDTH (Mbps) | DISK I/O (Gpbs) | MINIMUM VALUE |
|---|---|---|---|---|---|---|
| 1 | REFERENCE HOST | 14400 | 16 | 3600 | 6 | |
| 2 | VIRTUAL HOST 1 | 1 | 1 | 0.533333333 | 0.333333333 | 0.333333 |
| 3 | VIRTUAL HOST 2 | 0.6666667 | 0.125 | 1 | 0.666666667 | 0.125 |
| 4 | VIRTUAL HOST 3 | 0.2083333 | 0.375 | 0.069444444 | 1 | 0.069444 |

FIG. 20

| # | STORAGE APPARATUS NAME | RAID GROUP | IOPS UPPER LIMIT | LU | TOTAL CAPACITY (GB) | UNUSED CAPACITY (GB) |
|---|---|---|---|---|---|---|
| 1 | STORAGE APPARATUS 1 | RAID1 | 1900 | RR | 500 | 125 |
| 2 | STORAGE APPARATUS 1 | RAID2 | 2400 | SS | 600 | XXX |
| 3 | STORAGE APPARATUS 1 | RAID2 | 2400 | TT | 600 | XXX |
| 4 | STORAGE APPARATUS 2 | RAID1 | 1600 | UU | 400 | XXX |
| 5 | STORAGE APPARATUS 2 | RAID2 | 1900 | VV | 600 | XXX |
| 6 | STORAGE APPARATUS 2 | RAID2 | 1900 | WW | 1600 | XXX |

FIG. 21

STORAGE APPARATUS XX-RAID YY    T120

| TIME STAMP | IOPS |
|---|---|
| 2012/9/10 0:10 | 561.4266 |
| 2012/9/10 1:10 | 687.8316 |
| 2012/9/10 2:10 | 726.315 |
| 2012/9/10 3:10 | 689.1761 |
| 2012/9/10 4:10 | 638.9638 |
| 2012/9/10 5:10 | 616.5861 |
| 2012/9/10 6:10 | 652.1553 |
| 2012/9/10 7:10 | 633.8552 |
| 2012/9/10 8:10 | 442.0529 |
| 2012/9/10 9:10 | 429.0854 |
| 2012/9/10 10:10 | 532.8662 |
| 2012/9/10 11:10 | 564.4155 |
| 2012/9/10 12:10 | 571.0058 |

| TIME STAMP | VIRTUAL GUEST NAME | ACTION |
|---|---|---|
| 2011/12/10 XX:XX:XX | VIRTUAL GUEST 1 | ADD |
| 2011/12/10 XX:XX:XX | VIRTUAL GUEST 2 | ADD |
| 2011/12/10 XX:XX:XX | VIRTUAL GUEST 3 | ADD |
| 2011/12/10 XX:XX:XX | VIRTUAL GUEST 4 | ADD |
| 2012/08/15 XX:XX:XX | VIRTUAL GUEST 4 | DELETE |

T131    T132    T133

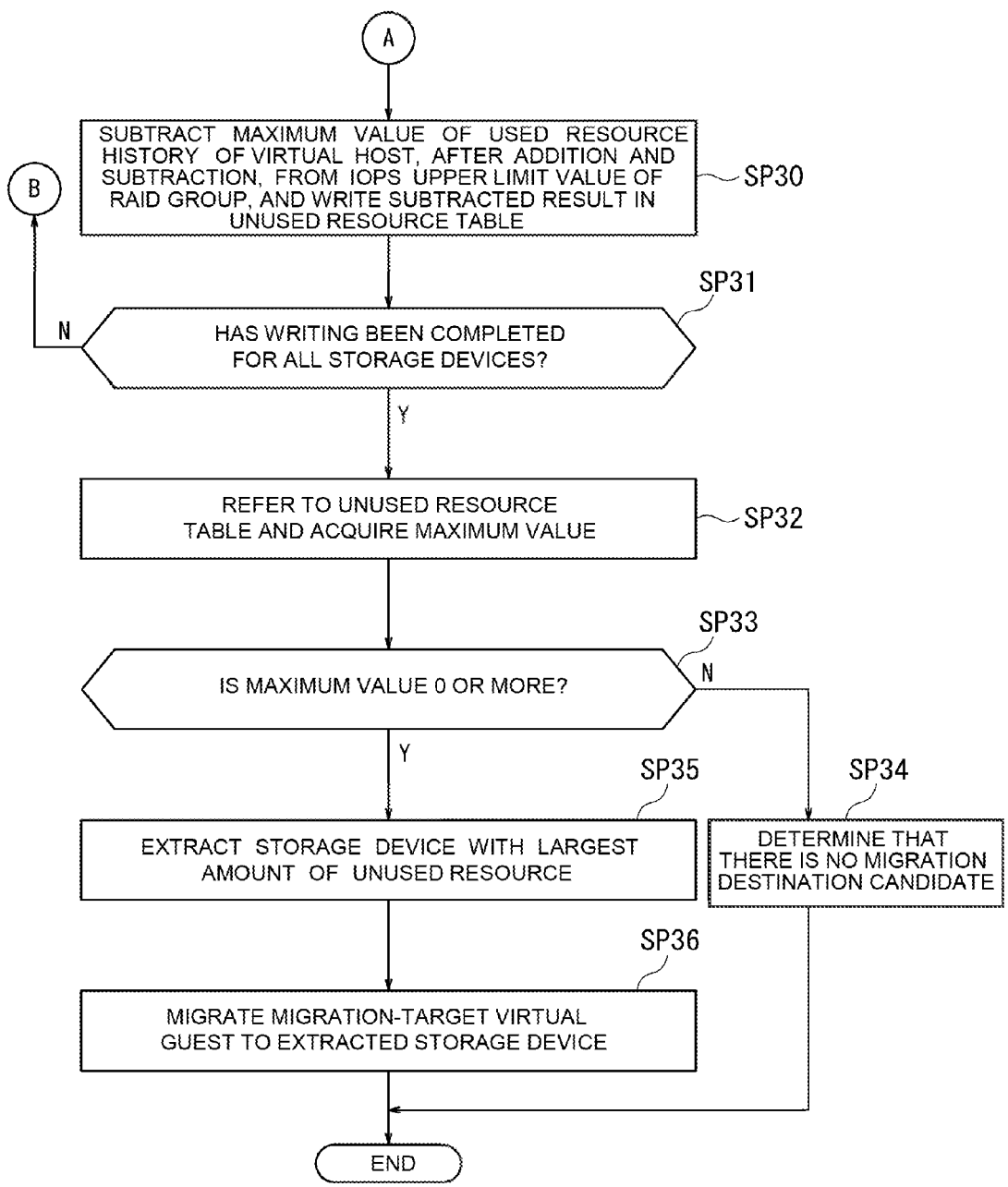

VIRTUAL GUEST MANAGEMENT SYSTEM AND VIRTUAL GUEST MANAGEMENT METHOD

TECHNICAL FIELD

The present invention relates to a virtual guest management system and a virtual guest management method, and in particular can be suitably applied to a virtual guest management system and a virtual guest management method for migrating a virtual guest in consideration of the use history of resources used by that virtual guest.

BACKGROUND ART

Conventionally, known is virtualization technology of arranging one or more virtual machines (hereinafter referred to as the "virtual guest(s)") on a server apparatus having a virtualization function (hereinafter referred to as the "virtual host"), and dynamically assigning a physical resource (hereinafter referred to as the "resource") to each of the one or more virtual guests that were arranged.

Note that the term "virtual guest" refers to virtualization software that runs on a hypervisor of the virtual host. Moreover, the term "resource" refers to physical resources such as a CPU (Central Processing Unit), a memory, a disk adapter and a network adapter configuring the virtual host, and a storage capacity of the storage apparatus that provides a storage area to the virtual host.

Moreover, in recent years, known is virtualization technology of migrating (relocating) a part of one or more virtual guests arranged on a virtual host to another virtual host with a lower processing load. This virtualization technology related to the migration of virtual guests is disclosed, for example, in PTL 1 indicated below.

PTL 1 discloses a virtual machine management apparatus capable of ensuring the processing performance of a plurality of virtual guests while realizing cost reduction, in a system including a plurality of virtual hosts on which each of the virtual guests is running, by appropriately arranging the virtual guests in the virtual hosts.

Specifically, disclosed is technology of collecting the usage of resources to be used by the virtual guest and the amount reserved (margin) which is expected to be additionally required, combining the collected usage and margin of the resources, and calculating the combined amount of resources as the amount of resources that is required by the virtual guest. Note that the margin which is expected to be additionally required is calculated based on the amount of resources that was used when the processing of that virtual guest was at its peak.

Subsequently, when migrating the migration-target virtual guest to another virtual host with a lower processing load, the virtual host on which a virtual guest, having a margin that is similar to that of the migration-target virtual guest, is running, is selected as the destination virtual host.

Since virtual guests with similar margins can be aggregated and arranged as a result of selecting the destination virtual host as described above, if a margin in an amount similar to that of the margin of the aggregated and arranged virtual guests is reserved in the virtual host as the fluctuation portion of the future throughput, it is possible to basically deal with the increase of throughput without having to reserve extra margin.

CITATION LIST

Patent Literature

[PTL 1]
Japanese Patent Application Publication No. 2011-198332

SUMMARY OF INVENTION

Technical Problem

Nevertheless, with the virtual machine management apparatus described in PTL 1, the amount of resources required by the virtual guest is simply a combination of the usage of resources to be used by the virtual guest, and the margin. The amount of resources required by the virtual guest, which was obtained by the foregoing combination, does not give any consideration to the timing that the virtual guest actually uses the resources.

In other words, the usage of resources that are used by the virtual guest is not always constant, and fluctuates from hour to hour, over time, according to the business affairs that are carried out by that virtual guest. Accordingly, unless the usage that is required by the virtual guest is calculated by giving consideration to the fluctuation of usage, extra resources, which will never be used in the virtual host, must also be reserved. Thus, resources will go to waste, and the usage efficiency of resources will deteriorate.

The present invention was devised in view of the foregoing points, and an object of this invention is to propose a virtual guest management system and a virtual guest management method capable of improving the usage efficiency of resources.

Solution to Problem

In order to achieve the foregoing object, the present invention provides a virtual guest management system comprising a plurality of virtual hosts, a virtual guest arranged in each of the plurality of virtual hosts, and a management system that manages migration of the virtual guest, wherein the management system reflects a used resource history of a migration-target virtual guest in a used resource history of a destination candidate virtual host, estimates a fluctuation in a future resource usage of the destination candidate virtual host, upon assuming that the migration-target virtual guest was migrated thereto, and determines the destination virtual host among the destination candidate virtual hosts based on an estimated result.

Moreover, in order to achieve the foregoing object, the present invention additionally provides a virtual guest management method in a virtual guest management system comprising a plurality of virtual hosts, a virtual guest arranged in each of the plurality of virtual hosts, and a management system that manages migration of the virtual guest, wherein the management system comprises a step of reflecting a used resource history of a migration-target virtual guest in a used resource history of a destination candidate virtual host, estimating a fluctuation in a future resource usage of the destination candidate virtual host, upon assuming that the migration-target virtual guest was migrated thereto, and determining the destination virtual host among the destination candidate virtual hosts based on an estimated result.

Advantageous Effects of Invention

According to the present invention, the usage efficiency of resources can be improved.

BRIEF DESCRIPTION OF DRAWINGS

FIG. 4 is a conceptual diagram showing the virtual guest used resource table.
FIG. 5 is a conceptual diagram showing the virtual guest connection table.
FIG. 6 is a conceptual diagram showing the virtual host connection table.
FIG. 7 is a conceptual diagram showing the virtual host used resource table.
FIG. 8 is a conceptual diagram showing the virtual host maximum value table.
FIG. 12 is a conceptual diagram showing the unused resource table.
FIG. 13 is a conceptual diagram showing the unused resource comparison table.
FIG. 20 is a conceptual diagram showing the storage configuration table.
FIG. 21 is a conceptual diagram showing the storage migration history table.
FIG. 22 is a conceptual diagram showing the used storage resource table.
FIG. 24 is a flowchart showing the virtual guest migration processing.

DESCRIPTION OF EMBODIMENTS

Figure 1:
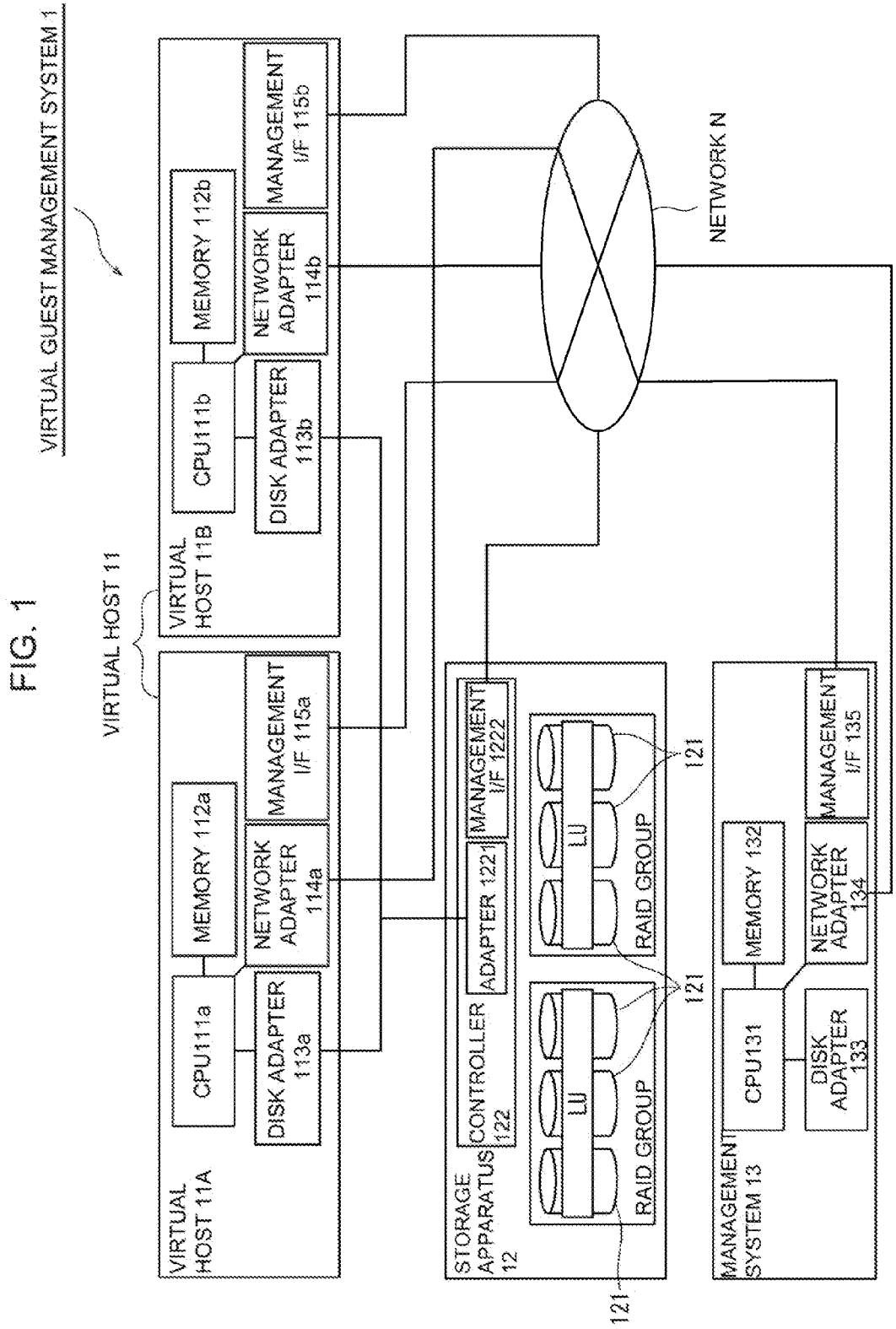
FIG. 1 is a conceptual diagram showing the overall configuration of the virtual guest management system.

An embodiment of the present invention is now explained in detail with reference to the drawings.
(1) First Embodiment
(1-1) Overall Configuration
FIG. 1 shows the overall configuration of the virtual guest management system 1. The virtual guest management system 1 is configured by comprising virtual hosts 11A, 11B, a storage apparatus 12 and a management system 13. The virtual hosts 11A, 11B, the storage apparatus 12 and the management system 13 are communicably connected to each other via a network N.

The virtual host 11A is a physical apparatus that provides a virtual guest (refer to FIG. 2) to a user, and is configured, for example, from a server apparatus. The virtual host 11A comprises a CPU (Central Processing Unit) 111a, a memory 112a, a disk adapter 113a, a network adapter 114a and a management I/F 115a.

The CPU 111a comprises a plurality of cores, and governs the operational control of the virtual host 11A based on the various programs stored in the memory 112a. Moreover, in addition to being used for retaining various programs and various tables, the memory 112a is also used as a work memory of the CPU 111a.

The disk adapter 113a is an interface that executes protocol control during the communication with the storage apparatus 12, and sends and receives various commands and data to and from the storage apparatus 12. Moreover, the network adapter 114a is an interface that sends and receives various types of data to and from another virtual host 11B or the storage apparatus 12 via a network N. Moreover, the management I/F 115a is an interface that sends and receives various commands to and from the management system 13 via the network N.

Similar to the virtual host 11A, the virtual host 11B is also a physical apparatus such as a server apparatus, and is configured by comprising a CPU 111b, a memory 112b, a disk adapter 113b, a network adapter 114b and a management I/F 115b. Since the function and configuration of the virtual host 11B are the same as those of the virtual host 11A, the explanation thereof is omitted.

Here, while a configuration of arranging the two virtual hosts of virtual hosts 11A and 11B is illustrated, the configuration is not limited thereto, and the configuration of arranging three or more virtual hosts may also be adopted. When referring to any one of the virtual hosts among the plurality of virtual hosts including the virtual hosts 11A and 11B in the ensuing explanation, that virtual host will simply be referred to as the "virtual host 11".

The storage apparatus 12 is configured by comprising a plurality of storage devices 121, and a controller 122 for controlling the input/output of data into and from the plurality of storage devices 121.

The storage device 121 is configured, for example, from an expensive disk device configured from SCSI (Small Computer System Interface) disks, or an inexpensive disk device configured from SATA (Serial AT Attachment) disks or optical disks. A RAID (Redundant Arrays of Inexpensive/Independent Disks) group is configured from a plurality of storage devices 121 of the same type, and one or more logical volumes (hereinafter referred to as the "logical units") LU are set on a storage area that is provided by the one or more storage devices 121 configuring the same RAID group. Data is stored in the logical units LU in units of a block of a predetermined size (hereinafter referred to as the "logical block").

Each of the logical units LU is assigned a unique identifier (hereinafter referred to as the "LUN: Logical Unit Number"), in the case of this embodiment, the input/output of data is performed by using a combination of the LUN and a number that is unique to that logical block (hereinafter referred to as the "LBA: Logical Block Address") which is assigned to each logical block as an address, and designating the address.

The controller 122 comprises an adapter 1221 and a management interface 1222 in addition to information processing resources such as a CPU and a memory.

The adapter 1221 executes the processing of writing data from the virtual host 11A or 11B into the logical unit LU, and the processing of reading the data stored in the logical unit LU and sending that data to the virtual host 11.

The management I/F 1222 functions as an interface that sends and receives various types of data to and from the management system 13 via the network N.

The management system 13 is a physical apparatus such as a server apparatus, and is configured by comprising a CPU 131, a memory 132, a disk adapter 133, a network adapter 134 and a management I/F 135. The management system 13 differs from the virtual host 11 with the function of running the virtual guests with respect to the point of comprising the function of managing the virtual guests arranged on the virtual host 11.

(1-2) Functional Configuration

Figure 2:
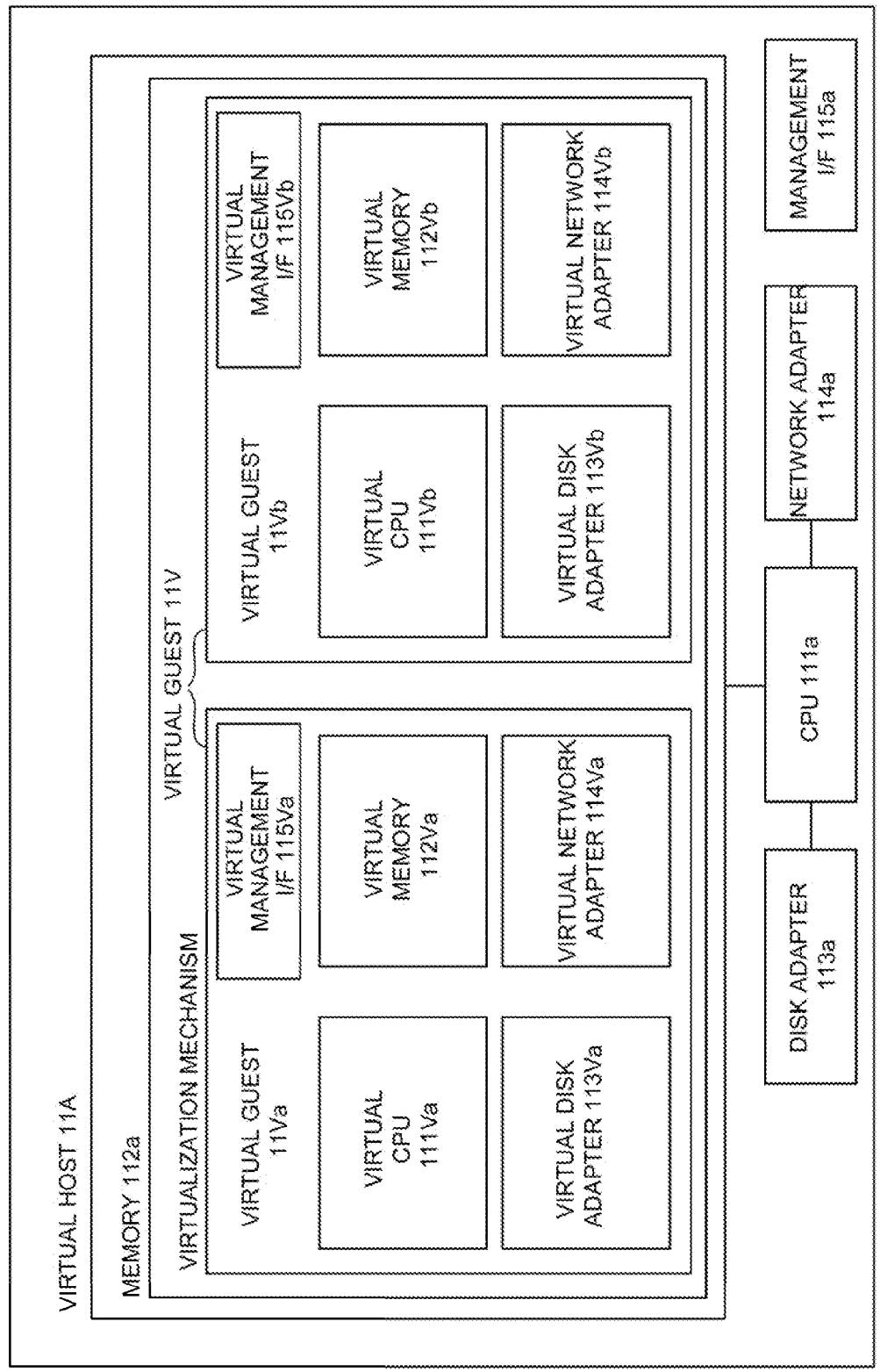
FIG. 2 is a conceptual diagram showing the functional configuration of the virtual host.

FIG. 2 shows the functional configuration of the virtual host 11A. The virtual host 11A is a server apparatus that provides a virtualization environment, and is configured by comprising a virtualization mechanism in the memory 112a. The virtualization mechanism is, for example, a hypervisor, and configured by comprising a plurality of virtual guests 11Va and 11Vb.

The virtual guest 11Va is a virtual computer that runs on the virtualization mechanism, and is recognized as an independent computer by the user of the virtual host 11A. The virtual guest 11Va is configured by comprising a virtual CPU 111Va, a memory 112Va, a disk adapter 113Va, a network adapter 114Va and a management I/F 115Va. These components such as the virtual CPU 111Va and the memory 112Va are dynamically assigned from resources of the virtual host 11A such as the CPU 111a and the memory 112a.

Similar to the virtual guest 11Va, the virtual guest 11Vb is also recognized as an independent computer by the user, and configured by comprising a virtual CPU 111Vb, a memory 112Vb, a disk adapter 113Vb, a network adapter 114Vb and a management I/F 115Vb. Similar to the virtual guest 11Va, these components such as the virtual CPU 111Vb and the memory 112Vb are also dynamically assigned from resources of the virtual host 11A such as the CPU 111a and the memory 112a.

In this embodiment, for example, when attempting to migrate the virtual guest 11Va to another virtual host 11, the usage of resources in the destination candidate virtual host 11 (hereinafter referred to as the "resource usage") on the assumption of migrating the virtual guest 11Va to the destination candidate virtual host 11 is estimated. Subsequently, the virtual host 11 with the best usage efficiency of resources is determined to be the destination virtual host 11. Thus, the migration-target virtual guest 11Va can be migrated to the destination virtual host 11 with the best usage efficiency of resources (for example, the virtual host 11B). Details of the virtual guest migration processing will be described later (refer to FIG. 16 and FIG. 17).

Here, while a configuration of arranging the two virtual guests of virtual guests 11Va and 11Va is illustrated, the configuration is not limited thereto, and the configuration of arranging three or more virtual guests may also be adopted. When referring to any one of the virtual guests among the plurality of virtual guests including the virtual guests 11Va and 11Va in the ensuing explanation, that virtual guest will simply be referred to as the "virtual guest 11V".

Moreover, here, while a configuration where the two virtual guests 11Va and 11Va are running on the virtual host 11A is illustrated, as with the virtual host 11A, a virtualization environment, on which one or more virtual guests 11V will run, is also created for the virtual host 11B and another virtual host 11 not shown.

Figure 3:
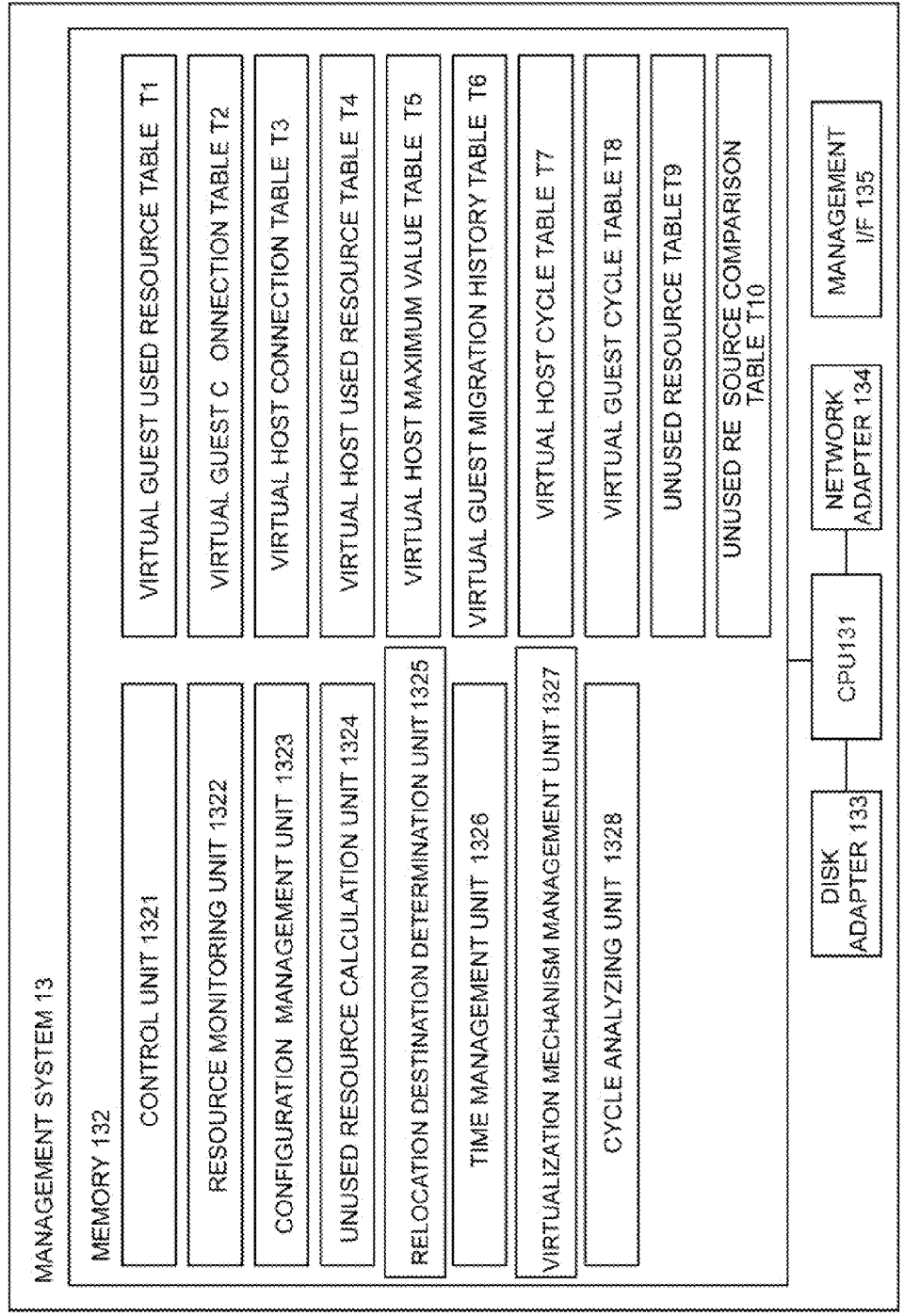
FIG. 3 is a conceptual diagram showing the functional configuration of the management system.

FIG. 3 shows the program group and the table group that are stored in the memory 132 of the management system 13. In the case of this embodiment, the memory 132 of the management system 13 stores, as programs, a control unit 1321, a resource monitoring unit 1322, a configuration management unit 1323, an unused resource calculation unit 1324, a relocation destination determination unit 1325, a time management unit 1326, a virtualization mechanism management unit 1327 and a cycle analyzing unit 1326.

The control unit 1321 governs the operational control of the resource monitoring unit 1322, the configuration management unit 1323, the unused resource calculation unit 1324, the relocation destination determination unit 1325, the time management unit 1326, the virtualization mechanism management unit 1327 and the cycle analyzing unit 1328.

For example, the control unit 1321 detects an addition of or a change to the virtual host 11 and the storage apparatus 12 in the virtual guest management system 1, a change in the configuration of the virtual guest 11V, and a change in the host 11 or the storage device 121 that assign resources to the virtual guest 11V, and commands the configuration management unit 1323 to update the corresponding tables.

Note that, in the foregoing case, the corresponding tables are, for example, a virtual guest connection table T2, a virtual host connection table T3, a virtual host maximum value table T5, a virtual guest migration history table T6, a storage configuration table T110 and a storage migration history table T130. Details of these tables will be explained later.

The resource monitoring unit 1322 monitors and acquires the resource usage of the virtual host 11 and the resource usage of the virtual guest 11V. The resource monitoring unit 1322 performs polling to the virtual host 11 and the virtual guest 11V, for example, every second or every minute, and acquires the resource usage that fluctuates in real time.

The configuration management unit 1323 manages the configurations related to the virtual host 11 and the virtual guest 11V such as the physical configuration of the virtual host 11 and the specification thereof, the virtual configuration of the virtual guest 11V arranged on the virtual host 11 and the specification thereof, and the arrangement configuration of the virtual guest 11V arranged on the virtual host 11.

The unused resource calculation unit 1324 calculates the maximum value of the respective resources based on the physical configuration and specification of the virtual host 11 that is managed by the configuration management unit 1323. Meanwhile, the unused resource calculation unit 1324 acquires the ever-changing resource usage of the virtual host 11 that was monitored and acquired by the resource monitoring unit 1322. In addition, the unused resource calculation unit 1324 calculates the amount of resources that has not been used (hereinafter referred to as the "amount of unused resource") by subtracting the maximum value of the ever-changing resource usage from the maximum value of the respective resources in the virtual host 11.

The relocation destination determination unit 1325 selects, among the destination candidate virtual hosts 11, the destination virtual host 11 that is estimated to have the best usage efficiency of resources upon migrating the migration-target virtual guest 11V thereto based on the amount of unused resource that was calculated by the unused resource calculation unit 1324.

The time management unit 1326 manages the time, and, for example, when the resource usage of the virtual host 11 is acquired by the resource monitoring unit 1322, generates a time stamp based on the time that the resource usage of the virtual host 11 was acquired.

The virtualization mechanism management unit 1327 executes the processing of migrating the migration-target virtual guest 11V to the selected destination virtual host 11 when the destination of the migration-target virtual guest 11V is determined by the relocation destination determination unit 1325.

The cycle analyzing unit 1328 analyzes and calculates the cycle that the virtual host 11 uses resources (hereinafter referred to as the "cycle of virtual host") and the cycle that the virtual guest 11V uses resources (hereinafter referred to as the "cycle of virtual guest").

Specifically, upon calculating the cycle of the virtual host 11, the cycle analyzing unit 1328 extracts the longest cycle among the cycles of the virtual guest 11V running on the virtual host 11, and calculates the extracted cycle as the cycle of the virtual host 11.

Moreover, upon calculating the cycle of the virtual guest 11V, the cycle analyzing unit 1328 refers to the virtual guest used resource table T1, performs Fourier transformation to the time series of the used resources, and thereby calculates the strength of the respective cycles (frequencies). Subsequently, the cycle analyzing unit 1328 calculates the strongest frequency within the frequency range of roughly 1 hour to 3 months among the calculated frequencies as the cycle of the virtual guest 11V. The cycle analyzing unit 1328 calculates the cycle regarding the respective resources such as the CPU and the memory, and uses the longest cycle of resources as the cycle of the virtual guest 11V.

Moreover, for instance, in cases where the virtual guest 11Va is to be migrated to the virtual host 11B, if the cycle of the virtual guest 11Va and the cycle of the virtual host 11B differ by being 1 day and 1 week, respectively, the cycle analyzing unit 1328 supplements the virtual guest 11Va with the short cycle to match the virtual host 11B with the long cycle.

Moreover, the memory 132 of the management system 13 stores, as tables, a virtual guest used resource table T1, a virtual guest connection table T2, a virtual host connection table T3, a virtual host used resource table T4, a virtual host maximum value table T5, a virtual guest migration history table T6, a virtual host cycle table T7, a virtual guest cycle table T8, an unused resource table T9 and an unused resource comparison table T10. These various tables are used upon migrating the migration-target virtual guest 11V (for instance, the virtual guest 11Va) to another virtual host 11 (for instance, the virtual host 11B).

FIG. 4 is a conceptual diagram of the virtual guest used resource table T1. The virtual guest used resource table T1 is a table that is prepared for each virtual guest 11V. The history of the resource usage by the migration-target virtual guest 11V heretofore (hereinafter referred to as the "used resource history") can be acquired from the virtual guest used resource table T1. The various types of information that are stored in the virtual guest used resource table T1 are recorded when the resource monitoring unit 1322 periodically makes an inquiry to the virtual guest 11V.

The virtual guest used resource table T1 is configured from a time stamp column T11, a CPU column T12, a memory column T13, a network column T14, a disk column T15, an IOPS column T16 and a used disk capacity column T17.

The time stamp column T11 stores time information that was acquired by the time management unit 1326. Moreover, the CPU column T12 stores the clock frequency as the processing performance of the virtual CPU (for instance, the CPU 111Va) of the virtual quest 11V. Moreover, the memory column T13 stores the used capacity of the virtual memory (for instance, the memory 112Va) of the virtual guest 11V.

Moreover, the network column T14 stores the communication speed (bandwidth) of the virtual network adapter (for instance, the network adapter 114Va) of the virtual guest 11V. Moreover, the disk column T15 stores the transfer speed of the virtual disk adapter (for instance, the disk adapter 113Va) of the virtual guest 11V. Moreover, the IOPS column T16 stores information indicating the processing performance of the reading or writing that can be processed by the virtual guest 11V per unit time. Moreover, the used disk capacity column T17 stores the used capacity of the storage capacity that is provided to the virtual guest 11V by the storage apparatus 12.

Accordingly, the example of FIG. 4 shows that, for example, the clock frequency of the CPU 111Va at the time of "2012/9/10 0:10" of the virtual guest 11Va is "1410" [MHz], the used capacity of the memory 112Va is "1397.5" [MB], the bandwidth of the network adapter 114Va is "5.0" [Mbps], the transfer speed of the disk adapter 113Va is "5.0" [Mbps], the IOPS is "1.9", and the used capacity of the storage capacity that is provided to the virtual guest 11V by the storage apparatus 12 is "120.1" [GB].

FIG. 5 is a conceptual diagram of the virtual guest connection table T2. Information regarding the network and the storage device 121 connected to the migration-target virtual guest 11V can be acquired from the virtual guest connection table T2. The various types of information that are stored in the virtual guest connection table T2 are recorded when the configuration management unit 1323 sets the arrangement configuration of the virtual guest 11V.

The virtual guest connection table T2 is configured from an identification number column T21, a virtual guest name column T22, a connection destination network column T23 and a connection destination LU column T24.

The identification number column T21 stores the identifying information of the virtual guest 11V. Moreover, the virtual guest name column T22 stores the virtual guest name. Moreover, the connection destination network column T23 stores information (for instance, the IP address) regarding the connection destination network. Moreover, the connection destination LU column T24 stores information (for instance, the storage device name) regarding the connection destination LU.

Accordingly, the example of FIG. 5 shows that, for example, the virtual guest name with the identification number of "1" is "virtual guest 1", the connection destination network of the "virtual guest 1" is "XX.XX.XX.XX" and "YY.YY.YY.YY", and the storage device name of the connection destination is "RR" and "SS".

FIG. 6 is a conceptual diagram of the virtual host connection table T3. Information regarding the storage device 121 and the network connected to the destination virtual host 11 can be acquired from the virtual host connection table T3. The various types of information that are stored in the virtual host connection table T3 are recorded when the configuration management unit 1323 sets the arrangement configuration of the virtual host 11.

The virtual host connection table T3 is configured from an identification number column T31, a virtual host name column T32, a connection destination LU column T33 and a connection destination network column T34.

The identification number column T31 stores the identifying information of the virtual host 11. Moreover, the virtual host name column T32 stores the virtual host name. Moreover, the connection destination LU column T33 stores information (for instance, the storage device name) regarding the connection destination LU. Moreover, the connection destination network column T34 stores information (for instance, the IP address) regarding the connection destination network.

Accordingly, the example of FIG. 6 shows that, for example, the virtual host name with the identification number of "1" is "virtual host 1", the storage device name of the connection destination of the "virtual host 1" is "RR" and "SS", and the connection destination network is "XX.XX.XX.XX" and "YY.YY.YY.YY".

FIG. 7 is a conceptual diagram of the virtual host used resource table T4. The virtual host used resource table T4 is a table that is prepared for each virtual host 11. The used resource history of the destination candidate virtual host 11 can be acquired from the virtual host used resource table T4. The various types of information that are stored in the virtual host used resource table T4 are recorded when the resource monitoring unit 1322 periodically makes an inquiry to the virtual host.

The virtual host used resource table T4 is configured from a time stamp column T41, a CPU column T42, a memory column T43, a network column T44, a disk column T45 and an IOPS column T46.

The time stamp column T41 stores the time information that was acquired by the time management unit 1326. Moreover, the CPU column T42 stores the clock frequency as the processing performance of the CPU (for instance, the CPU 111a) of the virtual host 11. Moreover, the memory column T43 stores the used capacity of the memory (for instance, the memory 112a) of the virtual host 11.

Moreover, the network column T44 stores the communication speed (bandwidth) of the network adapter (for instance, the network adapter 114a) of the virtual host 11. Moreover, the disk column T45 stores the transfer speed of the disk adapter (for instance, the disk adapter 113a) of the virtual host 11. Moreover, the IOPS column T46 stores information indicating the processing performance of the reading or writing that can be processed by the virtual host 11 per unit time.

Accordingly, the example of FIG. 7 shows that, for example, the clock frequency of the of the CPU 111a at the time of "2012/9/10 00:10" of the virtual host 11A is "16227" [MHz], the used capacity of the memory 112a is "16227.4" [MB], the bandwidth of the network adapter 114a is "58.8" [Mbps], the transfer speed of the disk adapter 113a is "19" [Mbps], and the IOPS is "2.3".

FIG. 8 is a conceptual diagram of the virtual host maximum value table T5. The maximum value of the resources as the specification of the destination candidate virtual host 11 can be obtained from the virtual host maximum value table T5. The various types of information that are stored in the virtual host maximum value table T5 are recorded when the configuration management unit 1323 sets the arrangement configuration of the virtual host 11. Note that, when a resource is added (hardware is enhanced) in the virtual host 11, the virtual host maximum value table T5 is updated by the configuration management unit 1323.

The virtual host maximum value table T5 is configured from an identification number column T51, a virtual host name column T52, a time stamp column T53, a CPU column T54, a memory capacity column T55, a network bandwidth column T56 and a disk I/O column T57.

The identification number column T51 stores the identifying information of the virtual host 11. Moreover, the virtual host name column T52 stores the virtual host name. Moreover, the time stamp column T53 stores the time information that was acquired by the time management unit 1326. Moreover, the CPU column T54 stores the clock frequency as the processing performance of the CPU (for instance, the CPU 111a) of the virtual host 11. Moreover, the memory capacity column T55 stores the total capacity of the memory (for instance, the memory 112a) of the virtual host 11.

Moreover, the network bandwidth column T56 stores the communication speed (bandwidth) of the network adapter (for instance, the network adapter 114a) of the virtual host 11. Moreover, the disk I/O column T57 stores the transfer speed of the disk adapter (for instance, the disk adapter 113a) of the virtual host 11.

Accordingly, the example of FIG. 6 shows that, for example, the virtual host name with the identification number of "1" is "virtual host 1", the time that the maximum value of the resources of the "virtual host 1" was recorded in the virtual host maximum value table T5 is "2011/10/12 12:00", the maximum value of the clock frequency of the CPU 111a is "36000" [MHz], the maximum capacity of the memory 112a is "96" [GB], the maximum value of the bandwidth of the network adapter 114a is "4096" [Mbps], and the maximum value of the transfer speed of the disk adapter 113a is "8" [Gbps].

Figure 9:
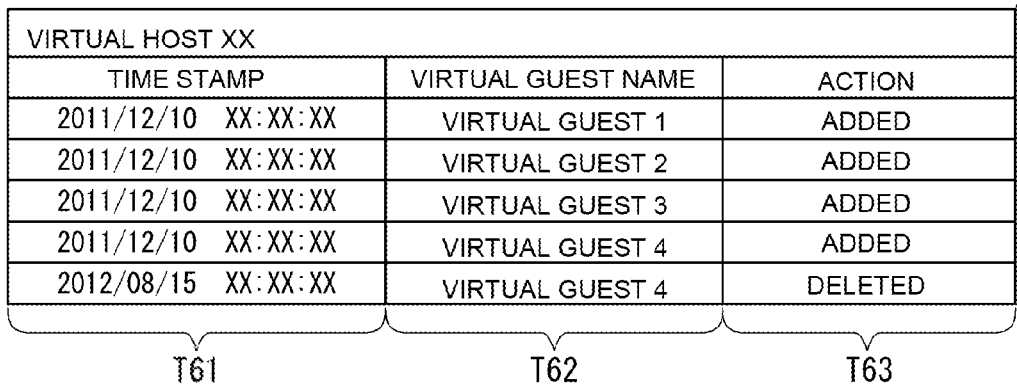
FIG. 9 is a conceptual diagram showing the virtual guest migration history table.

FIG. 9 is a conceptual diagram of the virtual guest migration history table T6. The virtual guest migration history table T6 is a table that is prepared for each virtual host 11. The history showing the addition or deletion of the virtual guest 11V in the destination candidate virtual host 11 can be acquired from the virtual guest migration history table T6. The various types of information that are stored in the virtual guest migration history table T6 are recorded and updated when the configuration management unit 1323 sets the arrangement configuration of the virtual guest 11V.

The virtual guest migration history table T6 is configured from a time stamp column T61, a virtual guest name column T62 and an action column T63.

The time stamp column T61 stores the time information that was acquired by the time management unit 1326. Moreover, the virtual guest name column T62 stores the virtual guest name. Moreover, the action column T63 stores information indicating that the virtual guest 11V was added or deleted.

Accordingly, the example of FIG. 9 shows that, for example, "virtual guest 1" was "Added" at the time of "2011/12/10 XX:XX:XX" in the virtual host XX (for instance, the virtual host 11A).

Figure 10:
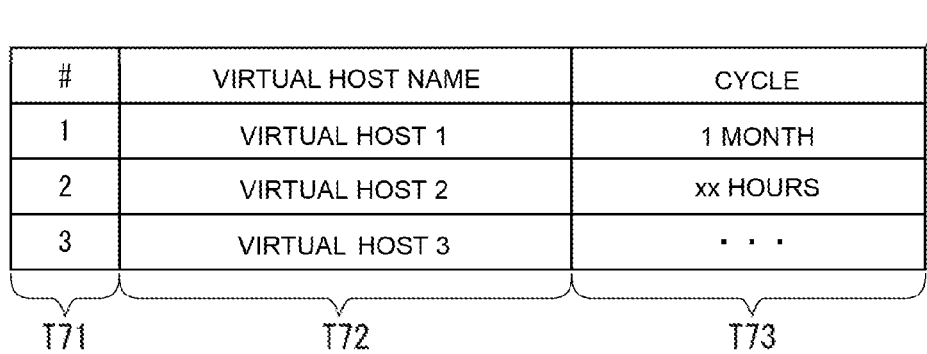
FIG. 10 is a conceptual diagram showing the virtual host cycle table.

FIG. 10 is a conceptual diagram of the virtual host cycle table T7. The cycle of the destination candidate virtual host 11 can be acquired from the virtual host cycle table T7. The various types of information that are stored in the virtual host cycle table T7 are recorded when the cycle analyzing unit 1328 calculates the longest cycle among the cycles of the virtual guest 11V running on the virtual host 11 as the cycle of the virtual host 11.

The virtual host cycle table T7 is configured from an identification number column T71, a virtual host name column T72 and a cycle column T73.

The identification number column T71 stores the identifying information of the virtual host 11. Moreover, the virtual host name column T72 stores the virtual host name. Moreover, the cycle column T73 stores the cycle of the virtual host 11.

Accordingly, the example of FIG. 10 shows that, for example, the virtual host name with the identification number of "1" is "virtual host 1", and the cycle of the "virtual host 1" is "1 month".

Figure 11:
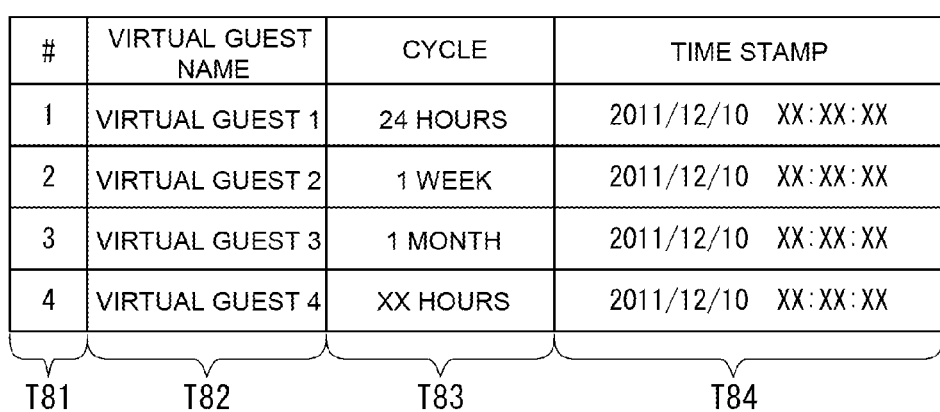
FIG. 11 is a conceptual diagram showing the virtual guest cycle table.

FIG. 11 is a conceptual diagram of the virtual guest cycle table T8. The cycle of the migration-target virtual guest 11V can be acquired from the virtual guest cycle table T8. The various types of information that are stored in the virtual guest cycle table T8 are recorded when the cycle analyzing unit 1328 calculates the cycle of the virtual guest 11V based on the various types of information that are stored in the virtual quest used resource table T1.

The virtual guest cycle table T8 is configured from an identification number column T81, a virtual guest name column T82, a cycle column T83 and a time stamp column T84.

The identification number column T81 stores the identifying information of the virtual guest 11V. Moreover, the virtual guest name column T82 stores the virtual guest name. Moreover, the cycle column T83 stores the cycle of the virtual guest 11V. Moreover, the time stamp column T84 stores the time information that was acquired by the time management unit 1326.

Accordingly, the example of FIG. 11 shows that, for example, the virtual guest name with the identification number of "1" is "virtual guest 1", the cycle of the "virtual guest 1" is "24 hours", and the time that the cycle was calculated and recorded is "2011/12/10 XX:XX:XX".

FIG. 12 is a conceptual diagram of the unused resource table T9. The amount of unused resource of the respective resources in the virtual host 11 can be acquired from the unused resource table T9. The various types of information that are stored in the unused resource table T9 are recorded when the unused resource calculation unit 1324 calculates the amount of unused resource of the virtual host 11.

The unused resource table T9 is configured from an identification number column T91, a virtual host name column T92, a CPU column T93, a memory capacity column T94, a network bandwidth column T95 and a disk I/O column T96.

The identification number column T91 stores the identifying information of the virtual host 11. Moreover, the virtual host name column T92 stores the virtual host name. Moreover, the CPU column T93 stores the clock frequency as the unused processing performance of the CPU (for instance, the CPU 111a) of the virtual host 11. Moreover, the memory capacity column T94 stores the capacity of the unused memory (for instance, the memory 112a) of the virtual host 11.

Moreover, the network bandwidth column T95 stores the unused bandwidth of the network adapter (for instance, the network adapter 114a) of the virtual host 11. Moreover, the disk I/O column T96 stores the unused transfer speed of the disk adapter (for instance, the disk adapter 113a) of the virtual host 11.

Accordingly, the example of FIG. 12 shows that, for example, the virtual host name with the identification number of "1" is "virtual host 1", the unused clock frequency of the CPU 111 of the "virtual host 1" is "14400" [MHz], the unused capacity of the memory 112a is "16" [GB], the unused bandwidth of the network adapter 114a is "1920" [Mbps], and the unused transfer speed of the disk adapter 113a is "2" [Gbps].

FIG. 13 is a conceptual diagram of the unused resource comparison table T10. Information for identifying the destination candidate with the best usage efficiency of resources among a plurality of destination candidate virtual hosts 11 can be acquired from the unused resource comparison table T10. The various types of information that are stored in the unused resource comparison table T10 are recorded when the unused resource calculation unit 1324 calculates the amount of unused resource of the virtual host 11.

The unused resource comparison table T10 is configured from an identification number column T101, a virtual host name column T102, a CPU column T103, a memory capacity column T104, a network bandwidth column T105, a disk I/O column T106 and a minimum value column T107.

The identification number column T101 stores the identifying information of the reference host and the virtual host 11. A reference host is a virtual host that is configured by extracting the maximum value from each amount of unused resource stored in the unused resource table T9. The reference host does not actually exist, and is an ideal virtual host that is configured so as to realize the optimal performance upon combining the amount of unused resources with the greatest values. Each amount of resource in the reference host is used upon calculating the values that are stored in the minimum value column T107 of the unused resource comparison table T10.

The virtual host name column T102 stores the reference host and virtual host name. Moreover, the CPU column T103 stores the value (CPU comparison value) obtained by dividing the clock frequency of the CPU of the reference host and the unused clock frequency of the CPU of the virtual host 11 by the clock frequency of the CPU of the reference host.

The memory capacity column T104 stores the value (memory comparison value) obtained by dividing the capacity of the memory of the reference host and the unused capacity of the memory of the virtual host 11 by the capacity of the memory of the reference host. Moreover, the network bandwidth column T105 stores the value (bandwidth comparison value) obtained by dividing the bandwidth of the network adapter of the reference host by the unused bandwidth of the network adapter of the virtual host 11 by the bandwidth of the network adapter of the reference host.

The disk I/O column T106 stores the value (I/O comparison value) obtained by dividing the transfer speed of the disk adapter of the reference host and the unused transfer speed of the disk adapter of the virtual host 11 by the transfer speed of the disk adapter of the reference host.

Accordingly, the example of FIG. 13 shows that, for example, the reference host name with the identification number of "1" is "reference host", and the clock frequency of the CPU of the reference host is "14400" [MHz], which is the maximum value among the clock frequencies that are stored in the CPU column T93 of the unused resource table T9.

Moreover, the memory capacity of the reference host is "16" [GB], which is the maximum value among the capacities that are stored in the memory capacity column T94 of the unused resource table T9, and the network bandwidth is "3600" [Mbps], which is the maximum value among the network bandwidths that are stored in the network bandwidth column T95 of the unused resource table T9.

Moreover, the transfer speed of the reference host is "6" [Gbps], which is the maximum value among the transfer speeds that are stored in the disk I/O column T96 of the unused resource table T9.

Moreover, the virtual host name with the identification number of "2" is "virtual host 1", the CPU comparison value of the "virtual host 1" is "1" which is obtained by dividing the clock frequency (14400 MHz) of the virtual host 1 that is stored in the CPU column T93 of the unused resource table T9 by the clock frequency (14400 MHz) of the reference host.

Moreover, the memory comparison value of the "virtual host 1" is "1", which is obtained by dividing the memory capacity (16 GB) of the virtual host 1 that is stored in the memory capacity column T94 of the unused resource table T9 by the memory capacity (16 GB) of the reference host. Moreover, the bandwidth comparison value of the "virtual host 1" is "0.5333", which is obtained by dividing the network bandwidth (1920 Mbps) of the "virtual host 1" that is stored in the network bandwidth column T95 of the unused resource table T9 by the network bandwidth (3600 Mbps) of the reference host.

Moreover, the I/O comparison value of the "virtual host 1" is "0.3333", which is obtained by dividing the transfer speed (2 Gbps) of the "virtual host 1" that is stored in the disk I/O column T96 of the unused resource table T9 the transfer speed (6 Gbps) of the reference host.

Moreover, among the comparison values (CPU comparison value, memory comparison value, bandwidth comparison value and I/O comparison value) of the resources in the "virtual host 1", the minimum value is "0.3333".

(1-3) Image of Writing Information into Tables

Figure 14:
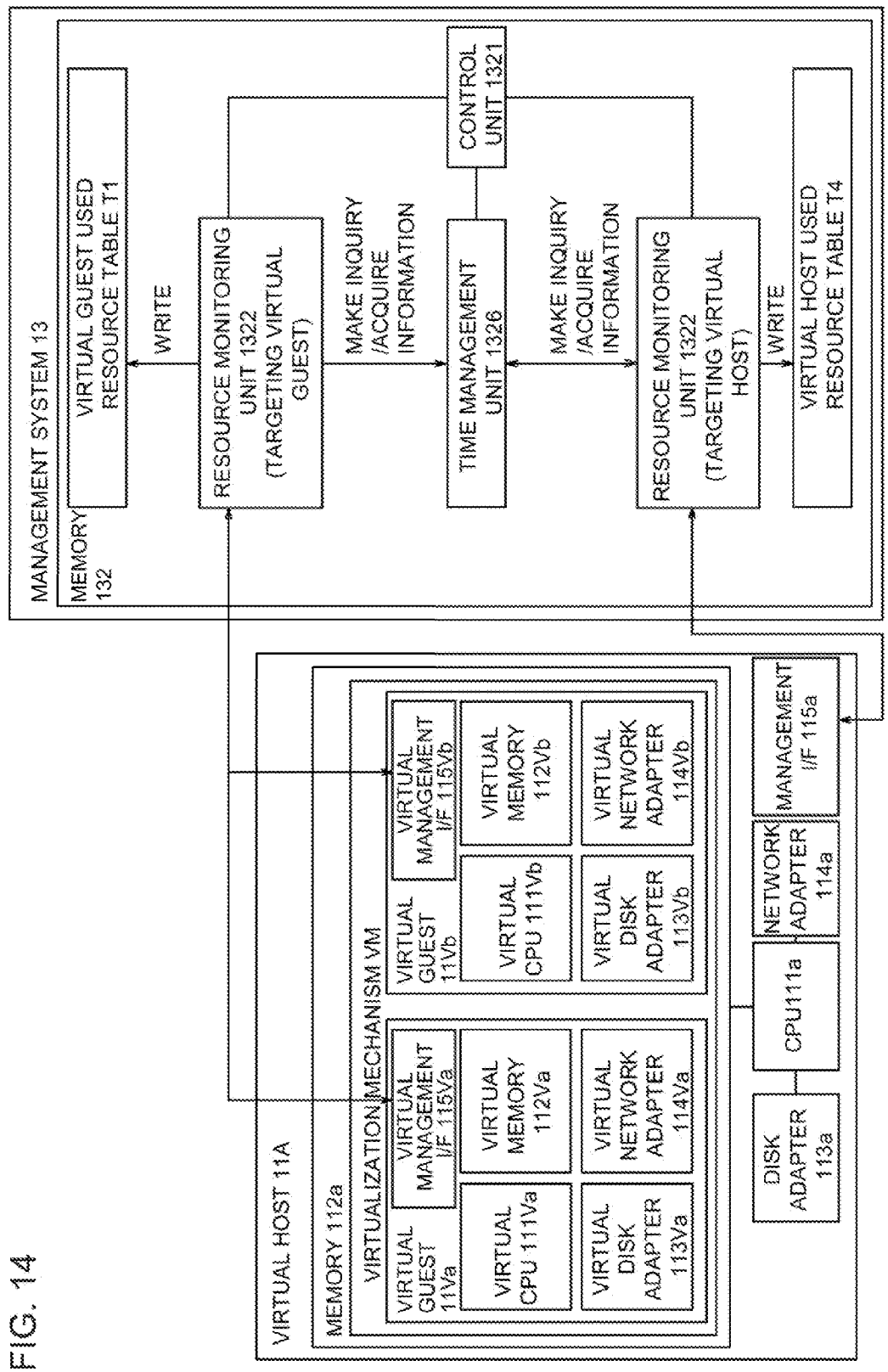
FIG. 14 is a conceptual diagram showing an image of writing information into the tables.

FIG. 14 shows a writing image of writing various types of information into the virtual guest used resource table T1 and the virtual host used resource table T4. In FIG. 14, the control unit 1321 controls the operation of the resource monitoring unit 1322 and the time management unit 1326, and executes the processing of writing various types of information into the virtual guest used resource table T1 and the virtual host used resource table T4.

Specifically, the resource monitoring unit 1322 periodically makes an inquiry to the virtual management I/F 115Va and the management I/F 115Vb based on a control signal from the control unit 1321, and periodically obtains the resource usage of the virtual guests 11Va and 11Vb. Note that, in reality, the resource monitoring unit 1322 accesses the virtual management I/F 115Va and the management I/F 115Vb via the network adapter 114a of the virtual host 11A.

Moreover, the resource monitoring unit 1322 periodically makes an inquiry to the management I/F 115a based on a control signal from the control unit 1321, and periodically acquires the resource usage of the virtual host 11A.

Moreover, the time management unit 1326 generates a time stamp of the time that the resource monitoring unit 1322 acquired the resource usage from the virtual guests 11Va, 11Vb and the virtual host 11A based on the control signal from the control unit 1321.

In addition, the control unit 1321 executes the processing of associating the resource usage acquired by the resource monitoring unit 1322 and the time stamp generated by the time management unit 1326, and writing the association in the virtual guest used resource table T1 and the virtual host used resource table T4, respectively.

Consequently, the control unit 1321 can acquire the used resource history of the virtual guests 11Va and 11Va by referring to the virtual guest used resource table T1. Moreover, when there is a cycle nature in the acquired history, the control unit 1321 can acquire the cycle of the resource usage of the virtual guests 11Va and 11Vb. Moreover, similarly, the control unit 1321 can acquire the used resource history of the virtual host 11A and, when there is a cycle nature in the acquired history, the cycle by referring to the virtual host used resource table T4.

(1-4) Image of Supplementing Cycle

Figure 15:
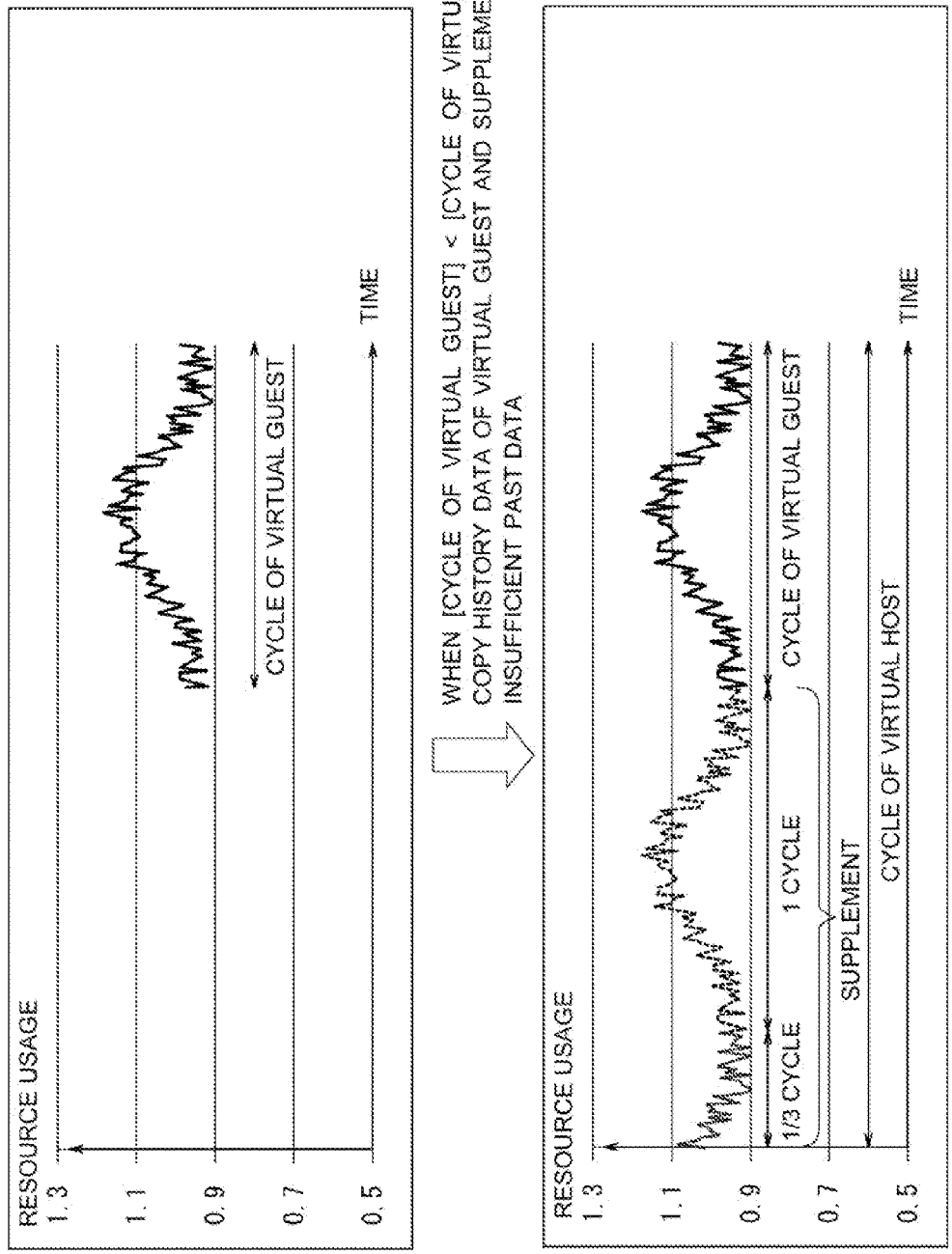
FIG. 15 is a conceptual diagram showing an image of supplementing the cycle.

FIG. 15 shows an image of supplementing the cycle. In FIG. 15, the horizontal axis of the upper graph represents the time and the vertical axis represents the used resource history of the virtual guest 11V as the resource usage (ratio). Moreover, the used resource history of the virtual guest 11V is indicated as the used resource history worth one cycle of the virtual guest 11V. Here, the explanation is provided on the assumption that one cycle of the virtual guest 11V is one week.

When the destination virtual host 11 is to be determined with the virtual guest 11V as the migration-target virtual guest 11V, in this embodiment, performed is the processing of adding the used resource history of the migration-target virtual guest 11V to the used resource history of the destination candidate virtual host 11 upon maintaining the same date and time, estimating the used resource history of the destination candidate virtual host 11, and estimating the allowance in the amount of resources of the virtual host 11 based on the resource usage at the point in time that will be the peak of the estimated used resource history.

Here, the past used resource history that is used for estimating the resource usage of the virtual host 11 is limited to the longest one-cycle period of the virtual guest 11V or the virtual host 11. If there is one-cycle worth of used resource history in the virtual guest 11V and the virtual host 11, mutually insufficient data can be supplemented by repeatedly copying the used resource history even in cases where the virtual guest 11V or the virtual host 11 was running in different schedules or periods. Thus, even if in reality the acquired used resource history is insufficient, the used resource history can be added or subtracted while maintaining the same date and time.

The horizontal axis in the lower graph represents the time, and the vertical axis represents the used resource history of the amount of resource (ratio) that supplemented the cycle of the virtual guest 11V. The lower graph is the used resource history that was supplemented by copying the cycle of the virtual guest 11V so that the used resource history of the virtual guest 11V of the upper graph becomes the cycle (for instance, one month) of the destination candidate virtual host 11. According to the used resource history of the virtual guest 11V of the lower graph, even in cases where in reality only one-week worth of used resource history was obtained, by copying and supplementing the insufficiency, it is possible to match the cycle of the destination candidate virtual host 11. Thus, the used resource history of the migration-target virtual guest 11V can be added to the used resource history of the destination candidate virtual host 11 while maintaining the same date and time.

Note that the cycle of the virtual host 11 will change depending on the virtual guest 11V that is running on the virtual host 11. Since there are cases where the virtual guest with a cycle that is longer than the virtual host 11 is migrated, it is desirable not to delete the used resource history of the virtual host 11 even for portions exceeding the cycle, and retain the longest portion of the cycle of the virtual guest 11V in the overall system.

(1-5) Flowchart

Figure 16:
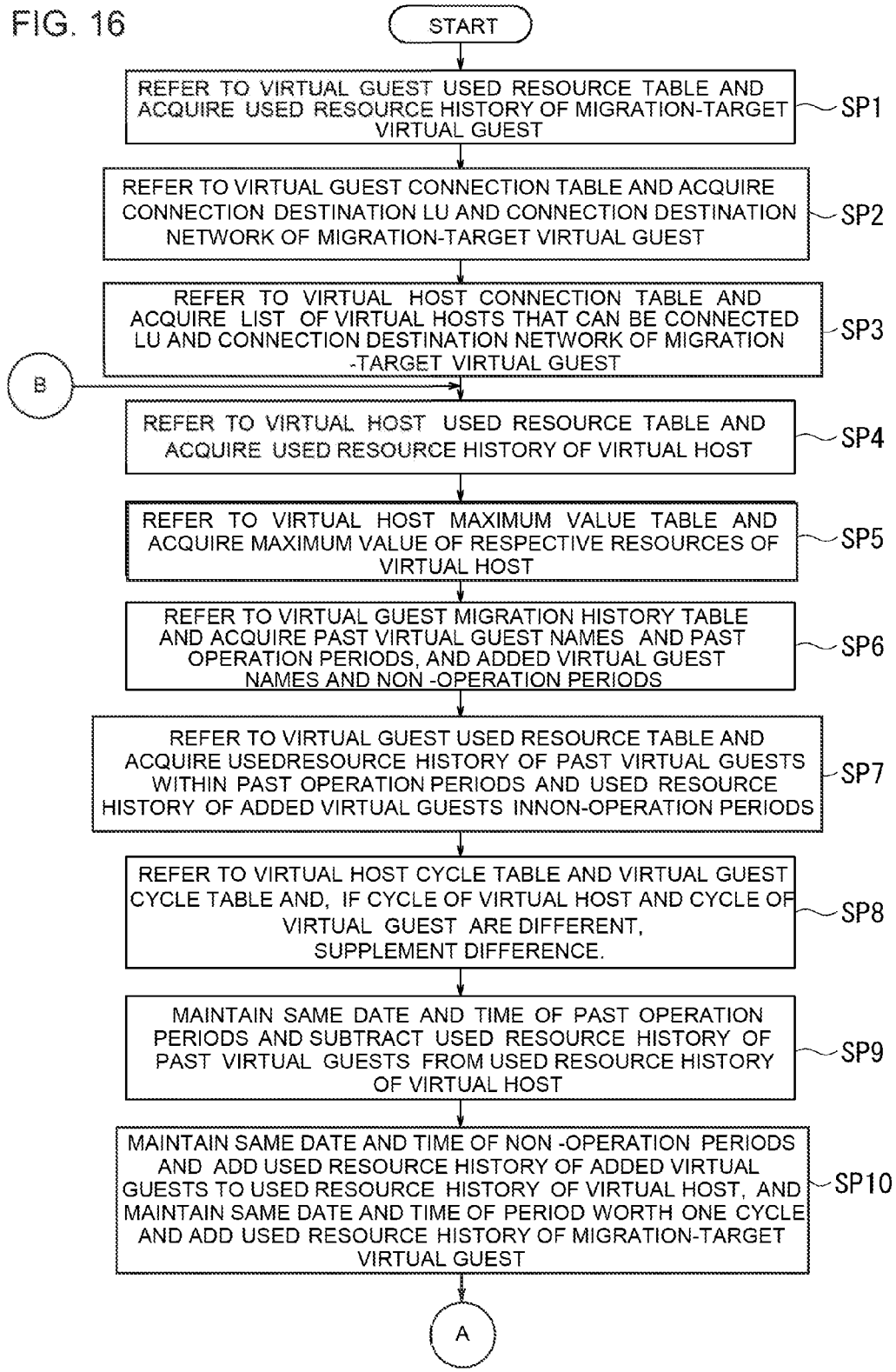
FIG. 16 is a flowchart showing the virtual guest migration processing.
Figure 17:
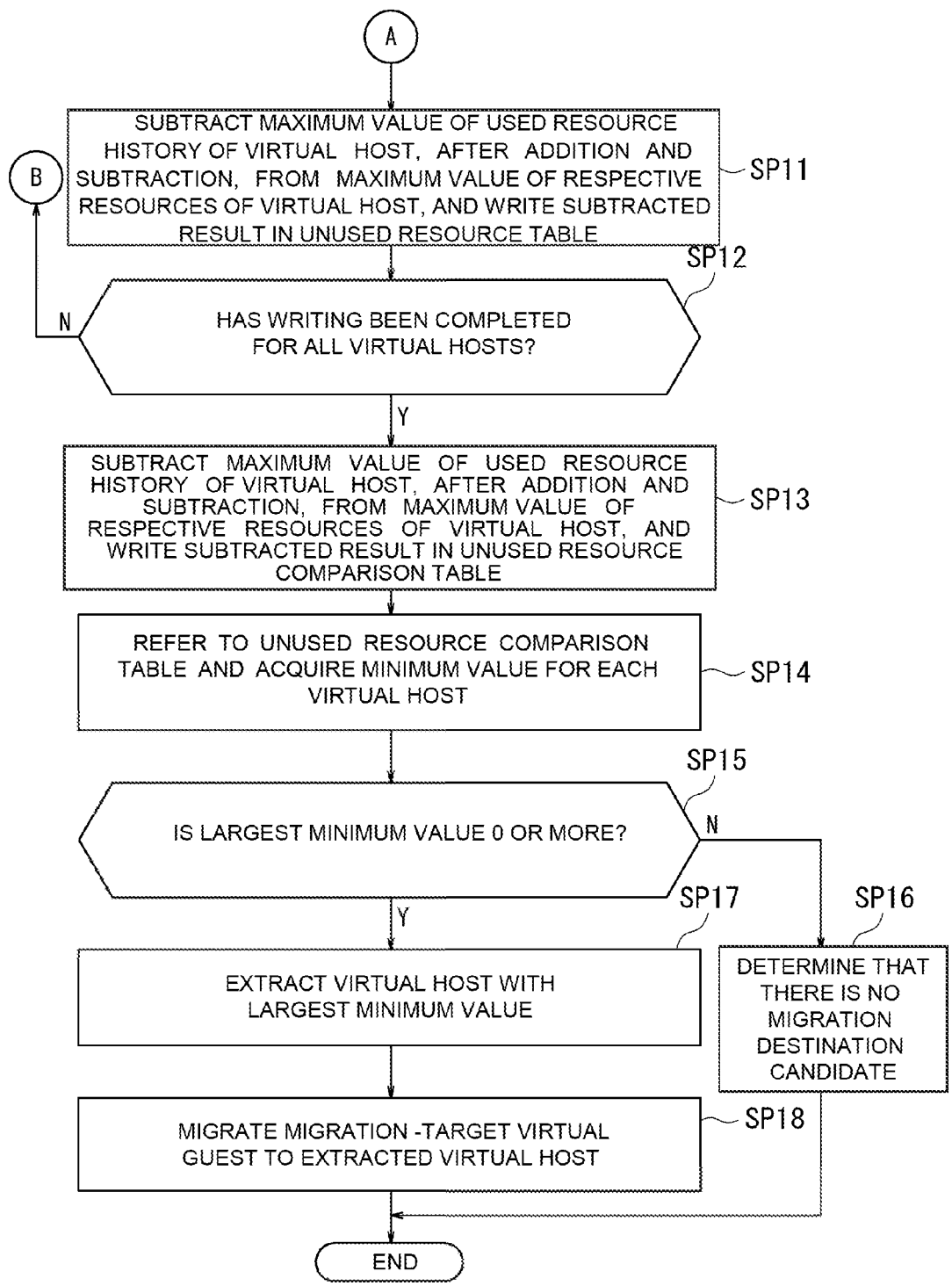
FIG. 17 is a flowchart showing the virtual guest migration processing.

FIG. 16 and FIG. 17 show the processing routine of the virtual guest migration processing. The virtual guest migration processing is executed when the management system 13 receives a migration command for migrating the virtual guest 11V.

Note that the migration command to be received by the management system 13 may be, for example, a command from the user or a command that is periodically issued for each predetermined period. Moreover, the migration command for migrating the virtual guest 11V is simply a command for migrating the migration-target virtual guest 11V, and does not designate the destination virtual host 11. The destination virtual host 11 is determined based on this processing.

Moreover, while the virtual guest migration processing explained below is executed with the coordination of the CPU 131 of the management system 13 and the various programs and various tables stored in the memory 132, for the purpose of illustration, the explanation is provided with the control unit 1321 as the processing entity.

Foremost, the control unit 1321 refers to the virtual guest used resource table T1, and acquires the used resource history of the respective resources that have been used by the migration-target virtual guest 11V heretofore (SP1).

Note that, when the migration-target virtual guest 11V is a new virtual guest 11V to be newly added to the virtual guest management system 1, a used resource history does not exist. In the foregoing case, the control unit 1321 acquires, as the used resource history of the new virtual guest, the amount of resource of a predetermined ratio (for instance, 60% or the like) relative to the maximum value (specification) of the amount of resource that can be used by the new virtual guest 11V or the amount of resource of the average value of the other virtual guests 11V. Otherwise, the used resource history of another virtual guest 11V that performs the same business affairs as the new virtual guest 11V and which has the same maximum value of the amount of resource that can be used by the new virtual guest 11V can also be acquired as the used resource history of the new virtual guest 11V.

Subsequently, the control unit 1321 refers to the virtual guest connection table T2, and acquires information regarding the connection destination LU and the connection destination network of the migration-target virtual guest 11V (SP2).

Subsequently, the control unit 1321 refers to the virtual host connection table T3, and acquires, as a list of destination candidates, a list of the virtual hosts 11 that can be connected to the connection destination LU and connection destination network of the virtual guest 11V acquired in step SP2 (SP3).

Subsequently, the control unit 1321 refers to the virtual host used resource table T4, and acquires the used resource history of the respective resources that have been used heretofore regarding one of the virtual hosts 11 among the destination candidates acquired in step SP3 (SP4).

Subsequently, the control unit 1321 refers to the virtual host maximum value table T5, and acquires the maximum value of the respective resources of the destination candidate virtual host 11 referred to in step SP4 (SP5).

Subsequently, the control unit 1321 refers to the virtual guest migration history table T6, and acquires a past virtual guest name of a virtual guest that was arranged and running in the past but is not currently arranged and is not currently running in the destination candidate virtual host 11 referred to in steps SP4 and SP5, and a past operation period in which that virtual guest was running, as well as an added virtual guest name of a virtual guest that was running on another virtual host 11 in the past but is currently arranged and running in the destination candidate virtual host 11 referred to in steps SP4 and SP5, and a non-operation period in which that virtual guest was not running (SP6).

Subsequently, the control unit 1321 refers to the virtual guest used resource table T1 and acquires the used resource history of the respective resources that were used during the past operation period by the past virtual guest 11V acquired in step SP6, and acquires the used resource history of the respective resources that were used during the non-operation period by the added virtual guest 11V (SP7).

Subsequently, the control unit 1321 refers to the virtual host cycle table T7 and the virtual guest cycle table T8 and, when the cycle of the destination candidate virtual host 11 differs from the cycle of the past virtual guest 11V referred to in step SP7, the cycle of the current virtual guest 11V or the cycle of the migration-target virtual guest 11V, the control unit 1321 supplements any of the cycles of the virtual host 11 or the virtual guest 11V so that the cycles will mutually be the same (refer to FIG. 15) (SP8).

Note that, when the cycles are mutually the same or there is no insufficient data, steps SP9 and SP10 below are executed with regard to the actual used resource history without supplementing the cycle upon maintaining the same date and time.

The control unit 1321 subtracts the used resource history of the past virtual guest 11V from the used resource history of the destination candidate virtual host 11 while maintaining the same date and time with regard to the past operation period acquired in step SP6 (SP9).

Moreover, the control unit 1321 adds the used resource history of the added virtual guest 11V to the used resource history of the destination candidate virtual host 11 upon maintaining the same date and time with regard to the non-operation period acquired in step SP6, and adds the used resource history of the migration-target virtual guest 11V to the used resource history of the destination candidate virtual host 11 upon maintaining the same date and time with regard to a period that is worth one cycle of the virtual host 11 (SP10).

Subsequently, the control unit 1321 subtracts, from the maximum value of the respective resources of the destination candidate virtual host 11 acquired in step SP5, the maximum value of the used resource history of the virtual host 11 after the addition and subtraction in steps SP9 and SP10, and writes each amount of resource after the foregoing subtraction into the unused resource table T9 (SP11).

Subsequently, the control unit 1321 determines whether the writing into the unused resource table T9 regarding all virtual hosts 11 indicated on the list of destination candidates acquired in step SP3 is complete (SP12).

When the control unit 1321 obtains a negative result in this determination, the control unit 1321 proceeds to step SP4, performs the processing described above, and performs writing into the unused resource table T9 regarding another destination candidate virtual host 11.

Meanwhile, when the control unit 1321 obtains a positive result in the determination of step SP12, the control unit 1321 foremost refers to the unused resource table T9, calculates the amount of resource of the reference host, and writes the calculated amount of resource of the reference host into the unused resource comparison table T10. Subsequently, the control unit 1321 divides the amount of resource of any one of the virtual hosts 11 written into the unused resource table T9 by the amount of resource of the reference host, and writes those values and the minimum value among those values into the unused resource comparison table T10 (SP13).

Subsequently, the control unit 1321 refers to the unused resource comparison table T10, and acquires the minimum value of the amount of resource for each virtual host 11 (SP14).

Subsequently, the control unit 1321 determines whether the maximum value among the minimum values acquired in step SP14 is 0 or more (SP15).

When the control unit 1321 obtains a negative result in this determination, the control unit 1321 determines that there is no destination candidate among all destination candidate virtual hosts 11 because, if the migration-target virtual guest 11V is migrated, there will be a shortage of resources (SP16), and then ends this virtual guest migration processing.

Meanwhile, when the control unit 1321 obtains a positive result in the determination of step SP15, the control unit 1321 determines that a destination candidate virtual host 11 in which the minimum value is 0 or more will not result in a shortage of resources even if the migration-target virtual guest 11V is migrated thereto. Subsequently, the control unit 1321 extracts a virtual host 11 in which the minimum value acquired in step SP14 is maximum among the destination candidate virtual hosts 11 in which the minimum value is 0 or more (SP17).

Subsequently, the control unit 1321 determines the virtual host 11 extracted in step SP17 as the destination virtual host 11, issues a command to the virtualization mechanism management unit 1327 for migrating the migration-target virtual guest 11V to the determined destination virtual host 11 (SP18), and then ends this virtual guest migration processing.

(1-8) Effect of First Embodiment

As described above, according to the virtual guest management system 1 of this embodiment, when the migration-target virtual guest 11V is to be migrated, the destination virtual host 11 is determined based on the used resource history of the migration-target virtual guest 11V and the used resource history of the destination candidate virtual host 11. Thus, in comparison to the case of determining the destination virtual host 11 simply in consideration of the peak resource usage of the migration-target virtual guest 11V, it is possible to determine the destination virtual host 11 according to the actual usage condition (operation) without wasting resources. Thus, since the migration-target virtual guest 11V can be migrated to the destination virtual host 11 with the best usage efficiency of resources, the usage efficiency of resources can be improved.

(2) Second Embodiment

The virtual guest management system 1A in the second embodiment differs from the virtual guest management system 1 in the first embodiment with respect to the point that it is configured from a plurality of storage apparatuses 12a and 12b, the point that the management system 13 comprises a storage configuration table T110, a used storage resource table T120 and a storage migration history table T130, and the point that the RAID group (storage device 121 or logical unit LU), which is provided to a storage area to the migration-target virtual guest, is migrated to another RAID group (storage device 121 or logical unit LU) by using the foregoing tables. The same configuration as the first embodiment is given the same reference numeral and the explanation thereof is omitted, and only the different configurations are explained.

(2-1) Overall Configuration

Figure 18:
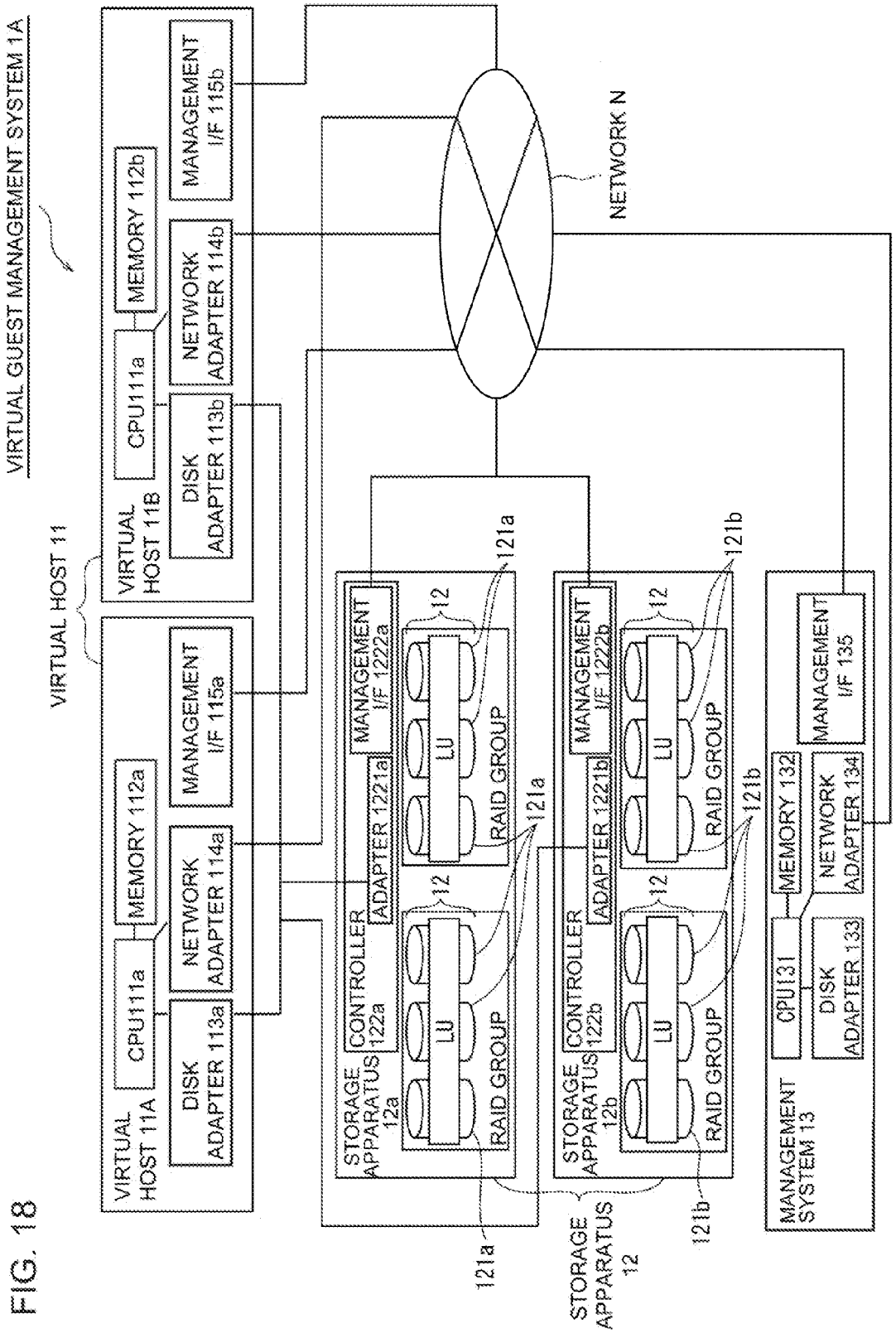
FIG. 18 is a conceptual diagram showing the overall configuration of the management system in the second embodiment.

FIG. 18 shows the overall configuration of the virtual guest management system 1A in the second embodiment. The virtual guest management system 1A differs from the virtual guest management system 1 in the first embodiment with respect to the point of being configured by comprising a plurality of storage apparatuses 12a and 12b.

The storage apparatus 12a is a storage apparatus comprising a RAID function, and is configured by comprising a plurality of storage devices 121a and a controller 122a. Since the function and configuration of the plurality of storage devices 121a and the controller 122a are the same as the function and configuration of the plurality of storage devices 121 and the controller 122 in the first embodiment, the explanation thereof is omitted.

As with the storage apparatus 12a, the storage apparatus 12b is a storage apparatus comprising a RAID function, and is configured by comprising a plurality of storage devices 121b and a controller 122b. Since the function and configuration of the storage apparatus 12b are the same as the function and configuration of the storage apparatus 12a, the explanation thereof is omitted.

Here, while a configuration of arranging the two storage apparatuses of storage apparatuses 12a and 12b is illustrated, the configuration is not limited thereto, and the configuration of arranging three or more storage apparatuses may also be adopted. When referring to any one of the storage apparatuses among the plurality of storage apparatuses including the storage apparatuses 12a and 12b in the ensuing explanation, that storage apparatus host will simply be referred to as the "storage device 121".

(2-2) Functional Configuration

Figure 19:
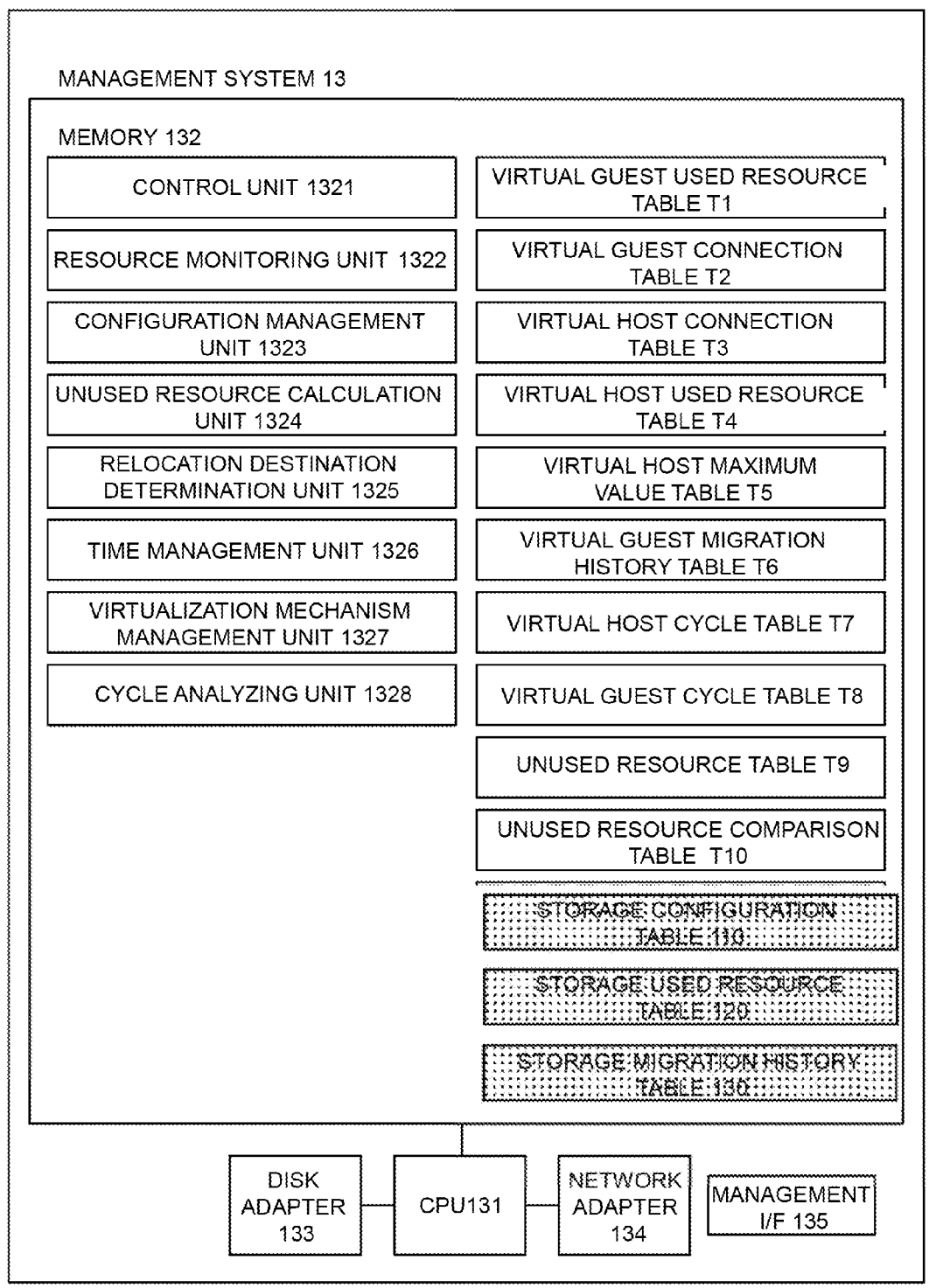
FIG. 19 is a conceptual diagram showing the functional configuration of the management system.

FIG. 19 shows the functional configuration of the management system 13. The management system 13 is configured by comprising a storage configuration table T110, a used storage resource table T120 and a storage migration history table T130 in a memory 132. These tables are used upon migrating a RAID group, which is providing a storage area to the migration-target virtual guest, to another RAID group.

FIG. 20 is a conceptual diagram of the storage configuration table T110. Information regarding the storage device 121 with sufficient unused capacity and information regarding the RAID group corresponding to that storage device 121 can be acquired from the storage configuration table T110. The various types of information that are stored in the storage configuration table T110 are recorded when the configuration management unit 1323 periodically makes an inquiry to the management I/F 1222 of the storage apparatus 12.

The storage configuration table T110 is configured from an identification number column T111, a storage apparatus name column T112, a RAID group column T113, an IOPS upper limit column T114, an LU column T115, a total capacity column T116 and an unused capacity column T117.

The identification number column T111 stores the identifying information of the storage device 121. Moreover, the storage apparatus name column T112 stores the storage apparatus name. Moreover, the RAID group column T113 stores the RAID group name. Moreover, the IOPS upper limit column T114 stores the maximum value of the readable/writable operations of the RAID group per unit time. Moreover, the LU column T115 stores the storage device name. Moreover, the total capacity column T116 stores the total capacity of the storage device 121. Moreover, the unused capacity column T117 stores the unused capacity of the storage device 121.

Accordingly, the example of FIG. 19 shows that, for example, the plurality of storage devices 121 with the identification number of "1" to "3" are arranged in the storage apparatus 12 with the storage apparatus name of "storage apparatus 1", the storage devices 121 with the identification number of "1" and "2" configure the RAID group with the RAID group name of "RAID1", and the IOPS upper limit value of "RAID1" is "1900".

Moreover, the storage device name of each of the storage devices 121 configuring "RAID1" is "RR" and "SS", the total storage capacity of the storage device 121 of "RR" is "500" [GB], and the unused capacity thereof is "125" [GB].

FIG. 21 is a conceptual diagram of the used storage resource table T120. The used storage resource table T120 is a table that is prepared for each storage apparatus 12 and each RAID group. The IOPS history of the destination candidate RAID group can be acquired from the used storage resource table T120. The various types of information that are stored in the used storage resource table T120 are recorded when the resource monitoring unit 1322 periodically makes an inquiry to the storage apparatus 12.

The used storage resource table T120 is configured from a time stamp column T121 and an IOPS column T122.

The time stamp column T121 stores the time information that was acquired by the time management unit 1326. Moreover, the IOPS column T122 stores the number of reading/writing operations performed by the RAID per unit time.

Accordingly, the example of FIG. 21 shows that, for example, the IOPS at the time of "2012/9/10 0:10" is "561.4266".

FIG. 22 is a conceptual diagram of the storage migration history table T130. The storage migration history table T130 is a table that is prepared for each storage device 121. The history indicating whether the virtual guest 11V was added or deleted in the destination candidate storage device 121 can be acquired from the storage migration history table T130. The various types of information that are stored in the storage migration history table T130 are recorded and updated when the configuration management unit 1323 sets the arrangement configuration of the virtual guest.

The storage migration history table T130 is configured from a time stamp column T131, a virtual guest name column T132 and an action column T133.

The time stamp column T131 stores the time information that was acquired by the time management unit 1326. Moreover, the virtual guest name column T132 stores the virtual guest name. Moreover, the action column T133 stores information indicating whether the virtual guest 11V was added or deleted.

Accordingly, the example of FIG. 22 shows, for example, the "virtual guest 1" was "Added" at the time of "2011/12/10 XX:XX:XX" in the LU XX (for instance, the storage device 121a).

(2-3) Flowchart

Figure 23:
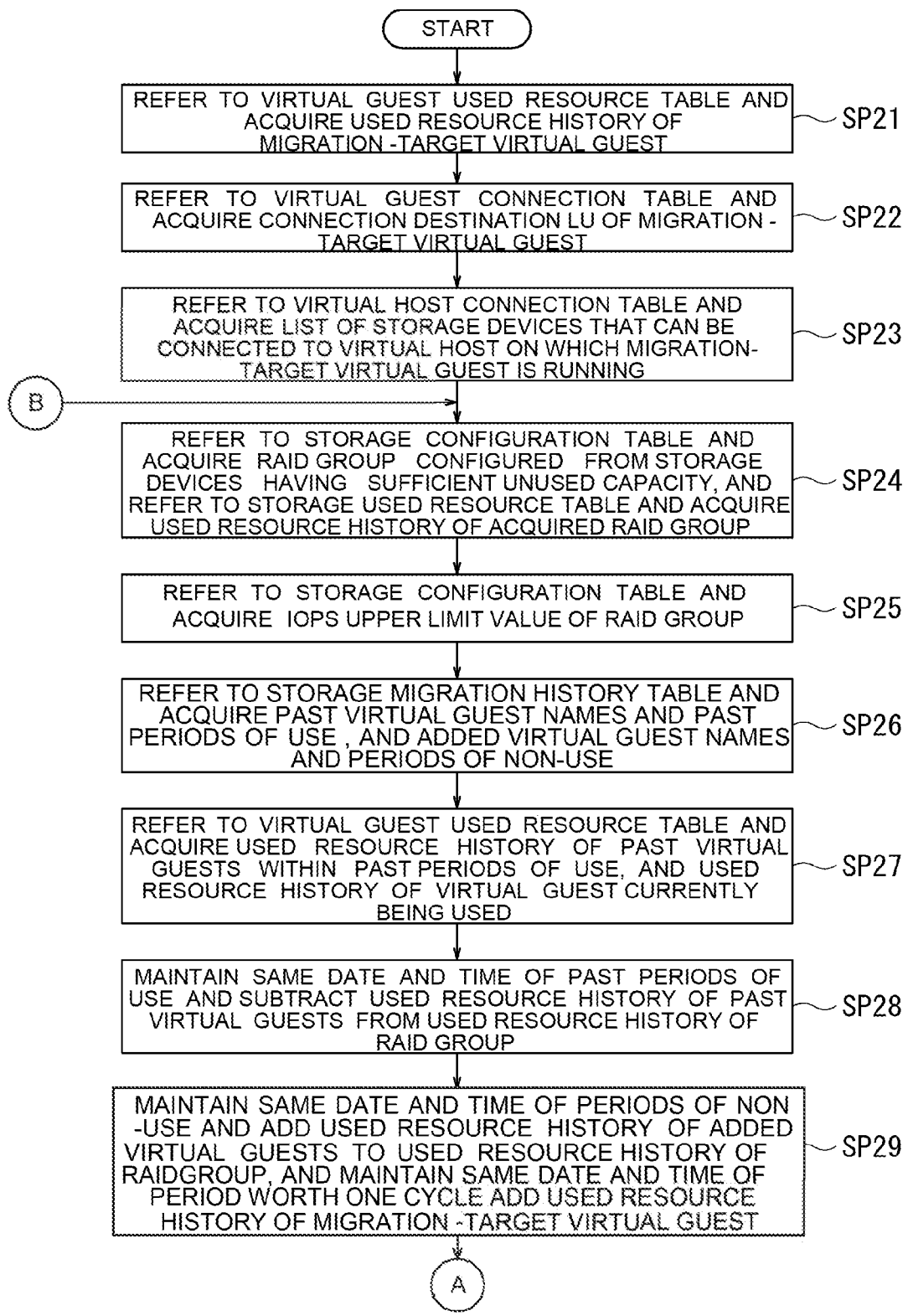
FIG. 23 is a flowchart showing the virtual guest migration processing.

FIG. 23 shows the processing routine of the virtual guest migration processing in the second embodiment. The virtual guest migration processing is executed when the management system 13 receives a migration command for migrating the virtual guest 11V.

Note that the migration command to be received by the management system 13 may be, for example, a command from the user or a command that is periodically issued for each predetermined period. Moreover, the migration command for migrating the virtual guest 11V is simply a command for migrating the migration-target virtual guest 11V, and does not designate the destination storage device 121. The destination storage device 121 is determined based on this processing.

Moreover, while the virtual guest migration processing explained below is executed with the coordination of the CPU 131 of the management system 13 and the various programs and various tables stored in the memory 132, for the purpose of illustration, the explanation is provided with the control unit 1321 as the processing entity.

The control unit 1321 foremost refers to the virtual guest used resource table T1, and acquires the used resource history of the respective resources that were used by the migration-target virtual guest 11V heretofore (SP21).

Subsequently, the control unit 1321 refers to the virtual guest connection table T2 and acquires the connection destination LU of the migration-target virtual guest 11V (SP22).

Subsequently, the control unit 1321 refers to the virtual host connection table T3 and acquires the virtual host 11 that can be connected to the connection destination LU of the virtual guest 11V acquired in step SP22. Subsequently, the control unit 1321 acquires, as a list of destination candidates, a list of the storage devices 121 that can be connected to the virtual host (SP23).

Subsequently, the control unit 1321 refers to the storage configuration table T110, and acquires a RAID group that is configured from a storage device 121 with sufficient unused capacity among the destination candidate storage devices 121 acquired in step SP23. Subsequently, the control unit 1321 refers to the used storage resource table T120 and acquires the used resource history of that RAID group (SP24).

Subsequently, the control unit 1321 refers to the storage configuration table T110, and acquires the IOPS upper limit value of the RAID group acquired in step SP24 (SP25).

Subsequently, the control unit 1321 refers to the storage migration history table T130, and acquires a past virtual guest name of a virtual guest that used in the past, but is not currently using, the destination candidate storage device 121 referred to in SP24 and SP25, and a past period of use thereof, and an added virtual guest name that used another storage device 121 in the past but is currently using this storage device 121, and a non-use period thereof (SP26).

Subsequently, the control unit 1321 refers to the virtual guest used resource tale T1 and acquires the used resource history of the respective resources that were used during the past operation period by the past virtual guest 11V acquired in step SP26, and acquires the used resource history of the respective resources that were used during the non-use period by the added virtual guest 11V (SP27).

Note that, when the cycle of the used resource history of the past or added virtual guest acquired in step SP27 and the cycle of the used resource history of the destination candidate RAID group acquired in step SP 24 are different, the control unit 1321 supplements one or both of the cycles so that the cycles will mutually be the same (refer to FIG. 15).

Subsequently, the control unit 1321 subtracts the used resource history (specifically IOPS) of the past virtual guest 11V from the used resource history (specifically IOPS) of the RAID group to which the destination candidate storage device 121 belongs while maintaining the same date and time with regard to the past period of use acquired in step SP26 (SP28).

Subsequently, the control unit 1321 adds the used resource history of the added virtual guest 11V to the used resource history of the RAID group to which the destination candidate storage device 121 belongs upon maintaining the same date and time with regard to the non-use period acquired in step SP26, and adds the used resource history of the migration-target virtual guest 11V to the used resource history of the RAID group upon maintaining the same date and time with regard to a period that is worth one cycle of the RAID group (SP29).

Subsequently, the control unit 1321 subtracts, from the IOPS upper limit value of the destination candidate RAID group acquired in step SP25, the maximum value of the used resource history of the RAID group after the addition and subtraction in steps SP28 and SP29, and writes each amount of resource after the foregoing subtraction into the unused resource table T9 (SP30).

Subsequently, the control unit 1321 determines whether the writing into the unused resource table T9 regarding all storage devices 121 indicated on the list of destination candidates acquired in step SP23 is complete (SP31).

When the control unit 1321 obtains a negative result in this determination, the control unit 1321 proceeds to step SP24, performs the processing described above, and performs writing into the unused resource table T9 regarding another destination candidate storage device 121.

Meanwhile, when the control unit 1321 obtains a positive result in the determination of step SP31, the control unit 1321 refers to the unused resource table T9 and acquires the maximum value (SP32).

Subsequently, the control unit 1321 determines whether the maximum value acquired in step SP32 is 0 or more (SP33).

When the control unit 1321 obtains a negative result in this determination, the control unit 1321 determines that there is no destination candidate among all destination candidate storage devices 121 because, if the migration-target virtual guest 11V is migrated, there will be a shortage of resources (SP34), and then ends this virtual guest migration processing.

Meanwhile, when the control unit 1321 obtains a positive result in the determination of step SP33, the control unit 1321 determines that a destination candidate storage device 121 in which the minimum value is 0 or more will not result in a shortage of resources even if the migration-target virtual guest 11V is migrated thereto. Subsequently, the control unit 1321 extracts a storage device 121 in which the amount of unused resource acquired in step SP32 is maximum among the destination candidate storage devices 121 in which the minimum value is 0 or more (SP35).

Subsequently, the control unit 1321 determines the storage device 121 extracted in step SP35 as the destination storage device 121, migrates the migration-target virtual guest 11V to the determined destination storage device 121 (SP36), and then ends this virtual guest migration processing.

(2-4) Effect of Second Embodiment

As described above, according to the virtual guest management system 1A of this embodiment, when the migration-target virtual guest 11V is to be migrated, the destination storage device 121 is determined based on the used resource history of the migration-target virtual guest 11V and the used resource history of the destination candidate storage device 121. Thus, in comparison to the case of determining the destination storage device 121 simply in consideration of the peak resource usage of the migration-target virtual guest 11V, it is possible to determine the destination storage device 121 according to the actual usage condition (operation) without wasting resources. Thus, since the migration-target virtual guest 11V can be migrated to the destination storage device 121 with the best usage efficiency of resources, the usage efficiency of resources can be improved.

(3) Other Embodiments

While the foregoing embodiments supplemented the used resource history of the virtual guest 11V or the virtual host 11 to match their respective cycles by copying the used resource history (cycle) from nearest in time toward the past as shown in FIG. 15, the present invention is not limited thereto, and, for example, the cycle of the virtual guest 11V or the virtual host 11 may be copied so as to match the start and end of one cycle with the start and end of the other cycle. In the foregoing case, the used resource history in the cycles can be more accurately compared to perform the addition or subtraction.

REFERENCE SIGNS LIST 1, 1A virtual guest management system
11, 11A, 11B virtual host
12, 12A, 12B storage apparatus
13 management system
131 CPU
132 memory

The invention claimed is:

1. A virtual guest management system comprising a plurality of virtual hosts, a virtual guest arranged in each of the plurality of virtual hosts, and a management system that manages migration of the virtual guest, wherein each of the virtual hosts comprises:
   a central processing unit (CPU); and
   a memory electronically coupled to the CPU, the memory comprising, as stored programs:
      a resource monitoring unit that periodically monitors and acquires a resource usage of the virtual host and a resource usage of the virtual guest;
      a time management unit that acquires an acquired time of the resource usage of the virtual host and an acquired time of the resource usage of the virtual guest acquired by the resource monitoring unit; and
      a control unit that governs the operational control of the resource monitoring unit and the time management unit, and that associates the resource usage and the acquired time of the resource usage and creates a used resource history of the virtual host and a used resource history of the virtual guest, and determines, based on the created used resource histories, a destination virtual host upon migrating a migration-target virtual guest, wherein the control unit reflects the used resource history of the migration-target virtual guest in the used resource history of a destination candidate virtual host, estimates a fluctuation in a future resource usage of the destination candidate virtual host, upon assuming that the migration-target virtual guest was migrated thereto, and determines the destination virtual host among the destination candidate virtual hosts a candidate virtual host having a largest minimum value of unused resources upon migrating the migration-target virtual guest thereto;
   wherein when the control unit reflects the used resource history of the migration-target virtual guest in the used resource history of the destination candidate virtual host, the control unit performs such reflection upon matching a date and time;
   wherein when there is an added virtual guest that is currently arranged in the destination candidate virtual host but was arranged in another virtual host in the past, the control unit reflects the used resource history of the added virtual guest in the used resource history of the destination candidate virtual host regarding a past period that the virtual guest was running on the other virtual host before being added;
   wherein when there is a past virtual guest that is not currently arranged in the destination candidate virtual host but was arranged in the destination candidate virtual host in the past, the control unit reflects the used resource history of the past virtual guest in the used resource history of the destination candidate virtual host regarding a past period that the past virtual guest was arranged and running in the past; and wherein the memory further comprises, as a stored program, a cycle analyzing unit that calculates a cycle of the virtual host as either a time interval or a frequency and a cycle of the virtual guest as either a time interval or a frequency based on the used resource histories of the virtual host and the virtual guest, and wherein when data of one of the used resource histories of either the used resource history of the migration candidate virtual host or the used resource history of the migration-target virtual guest is insufficient, the control unit supplements the insufficient used resource history by copying either the cycle of the virtual host or the cycle of the virtual guest calculated by the cycle analyzing unit.

2. The virtual guest management system according to claim 1, wherein with a new virtual guest to which the migration-target virtual guest is newly added and the used resource history does not exist, the control unit sets, as the used resource history of the new virtual guest, an amount of resource in a ratio that is predetermined relative to a maximum value of the amount of resource that can be used by the new virtual guest or an amount of resource of an average value of the other virtual guests existing in the virtual guest management system, wherein each amount of resource comprises at least one of: a clock frequency of a processor, a storage capacity of a memory, a bandwidth of a network, or a transfer speed of a disk adaptor.

3. The virtual guest management system according to claim 2, wherein the control unit sets, as the used resource history of the new virtual guest, the used resource history of a virtual guest that carries out same business affairs as the new virtual guest and which has the same maximum value as the maximum value of the amount of resource that can be used by the new virtual guest.

4. A virtual guest management method in a virtual guest management system comprising a plurality of virtual hosts, a virtual guest arranged in each of the plurality of virtual hosts, and a management system that manages migration of the virtual guest, wherein the management system method comprises:

a first step of periodically monitoring and acquiring a resource usage of the virtual host and a resource usage of the virtual guest;

a second step of acquiring an acquired time of the resource usage of the virtual host and an acquired time of the resource usage of the virtual guest acquired by the first step; and a third step of associating the resource usage and the acquired time of the resource usage and creating a used resource history of the virtual host and a used resource history of the virtual guest, and determining, based on the created used resource histories, a destination virtual host upon migrating a migration-target virtual guest, wherein the third step further includes:

a fourth step of reflecting the used resource history of the migration-target virtual guest in the used resource history of a destination candidate virtual host;

a fifth step of estimating a fluctuation in a future resource usage of the destination candidate virtual host, upon assuming that the migration-target virtual guest was migrated; and a sixth step of determining the destination virtual host among the destination candidate virtual hosts as a candidate virtual host having a largest minimum value of unused resources upon migrating the migration-target virtual guest thereto;

wherein in the fourth step, when the used resource history of the migration-target virtual quest is reflected in the used resource history of the destination candidate virtual host, such reflection is performed upon matching a date and time;

wherein in the fourth step, when there is an added virtual guest that is currently arranged in the destination candidate virtual host but was arranged in another virtual host in the past, the used resource history of the added virtual guest is reflected in the used resource history of the destination candidate virtual host regarding a past period that the virtual guest was running on the other virtual host before being added;

wherein in the fourth step, when there is a past virtual guest that is not currently arranged in the destination candidate virtual host but was arranged in the destination candidate virtual host in the past, the used resource history of the past virtual guest is reflected in the used resource history of the destination candidate virtual host regarding a past period that the past virtual guest was arranged and running in the past; and wherein in the fourth step, a cycle of the virtual host and a cycle of the virtual guest are calculated based on the used resource histories of the virtual host and the virtual guest, wherein each of the cycles is either a time interval or a frequency, and when data of one of the used resource histories of either the used resource history of the migration candidate virtual host or the used resource history of the migration-target virtual guest is insufficient, the insufficient used resource history is supplemented by copying either the calculated cycle of the virtual host or the calculated cycle of the virtual quest.

5. The virtual guest management method according to claim 4, wherein in the fourth step, with a new virtual guest to which the migration-target virtual guest is newly added and the used resource history does not exist, an amount of resource in a ratio that is predetermined relative to a maximum value of the amount of resource that can be used by the new virtual guest or an amount of resource of an average value of the other virtual guests existing in the virtual guest management system is set as the used resource history of the new virtual guest, wherein each amount of resource comprises at least one of: a clock frequency of a processor, a storage capacity of a memory, a bandwidth of a network, or a transfer speed of a disk adaptor.

6. The virtual guest management method according to claim 5, wherein in the fourth step, the used resource history of a virtual guest that carries out same business affairs as the new virtual guest and which has the same maximum value as the maximum value of the amount of resource that can be used by the new virtual guest is set as the used resource history of the new virtual guest.

* * * * *